(12) United States Patent
Contreras

(10) Patent No.: US 11,708,522 B1
(45) Date of Patent: Jul. 25, 2023

(54) WATER-BASED HYDROGEL POLYMER COMPOSITION AND METHODS OF TREATING SUBTERRANEAN FORMATIONS OR CEMENT CONSTRUCTIONS COMPRISING CONTAMINANTS

(71) Applicant: Saudi Arabian Oil Company, Dhahran (SA)

(72) Inventor: Elizabeth Contreras, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/689,543

(22) Filed: Mar. 8, 2022

(51) Int. Cl.
| | | |
|---|---|---|
| *E21B 43/16* | (2006.01) | |
| *C09K 8/512* | (2006.01) | |
| *C09K 8/588* | (2006.01) | |
| *C04B 24/32* | (2006.01) | |
| *C04B 28/02* | (2006.01) | |
| *C04B 24/26* | (2006.01) | |

(52) U.S. Cl.
CPC .......... *C09K 8/512* (2013.01); *C04B 24/2664* (2013.01); *C04B 24/32* (2013.01); *C04B 28/02* (2013.01); *C09K 8/588* (2013.01); *E21B 43/16* (2013.01)

(58) Field of Classification Search
CPC ..... C09K 8/512; C04B 24/2664; C04B 24/32; C04B 8/588; E21B 43/16
See application file for complete search history.

(56) References Cited

U.S. PATENT DOCUMENTS

| | | | | |
|---|---|---|---|---|
| 4,425,241 | A * | 1/1984 | Swanson | C09K 8/588 507/120 |
| 9,932,512 | B1 | 4/2018 | Hilfiger et al. | |
| 10,005,930 | B2 | 6/2018 | Reddy | |
| 10,351,752 | B2 | 7/2019 | Reddy et al. | |
| 2004/0244978 | A1 | 12/2004 | Shaarpour | |
| 2007/0209796 | A1* | 9/2007 | Santra | C09K 8/467 106/809 |
| 2008/0006404 | A1* | 1/2008 | Reddy | C04B 14/06 166/292 |
| 2014/0024561 | A1* | 1/2014 | Reddy | C09K 8/467 507/229 |
| 2017/0073569 | A1 | 3/2017 | Reddy | |
| 2022/0017811 | A1 | 1/2022 | Contreras | |

OTHER PUBLICATIONS

Ayala et al., "Synthesis, Characterization, and Properties of New Sequenced Poly(ether amide)s Based on 2-(4-Aminophenyl)-5-aminobenzimidazole and 2-(3-Aminophenyl)-5-aminobenzimidazole," Scheme 1 of Journal of Polymer Science: Part A: Polymer Chemistry, vol. 44, 1414-1423, 2006, 10 pages.

Shang et al., "Gel-tape-casting of aluminum nitride ceramics," Journal of Advanced Ceramics, Mar. 2017, 6(1): 67-72, 6 pages.

Storm et al., "Nonlinear elasticity in biological gels," Nature 435:191-94, May 12, 2005, 4 pages.

* cited by examiner

*Primary Examiner* — Silvana C Runyan
(74) *Attorney, Agent, or Firm* — Fish & Richardson P.C.

(57) ABSTRACT

This disclosure relates to methods of treating a subterranean formation or cement construction in the presence of one or more contaminants using a hydrogel composition that contains a poly-alkene maleic anhydride copolymer, a polyethylene glycol, and an aqueous carrier.

18 Claims, 11 Drawing Sheets

WATER-BASED HYDROGEL POLYMER COMPOSITION AND METHODS OF TREATING SUBTERRANEAN FORMATIONS OR CEMENT CONSTRUCTIONS COMPRISING CONTAMINANTS

TECHNICAL FIELD

This document relates to water-based hydrogel compositions that can be used in a variety of applications, such as treating subterranean formations and structures, including in the presence of contaminants, such as diesel.

BACKGROUND

In constructing oil and gas wells, cementing is the most important component. The purpose of cement is to give the well structural support and stability for the life of the well. When the cement fails, a resin is needed to seal these fractures and to recover the well. Instead of losing the well or having to drill a different well, zonal isolation is recovered using a sealant resin to block all flow paths to the surface; and in so doing, recovering the well. Compositions to seal off undesirable fluid paths such as gas flow channels, behind casings and fractured cement sheaths are typically based on non-aqueous epoxy monomers mixed with amines, furan resins, and polyester resins. When there is an unwanted gas or liquid flow through flow channels within a cement sheath behind a casing or between the casings, or via a microannulular flow channel between cement sheath and a metal casing, or via a microannulular flow channel between cement sheath and subterranean formation, resin based gel compositions in contact with the set cement may not demonstrate the desired sealing. Further, many resins are susceptible to harsh conditions, including extreme temperatures and pressures, and the presence of contaminants in the formation, and do not perform properly as a result. For example, as temperatures increase, hard-set resins soften and melt away. While hard-set resins demonstrate strength, the resins are also brittle like cement. Thus, there is a need for resins that can be used to seal off undesirable fluid paths and can operate under harsh conditions and in the presence of contaminants.

SUMMARY

Provided in the present disclosure is a method of treating a subterranean formation or cement construction containing contaminants. In some embodiments, the method includes providing to the subterranean formation or cement construction a hydrogel composition having a viscosity of about 2000 mPa·s to about 10,000 mPa·s at 22° C., where the composition contains a poly-alkene maleic anhydride copolymer; polyethylene glycol; and an aqueous carrier, where the total amount of the poly-alkene maleic anhydride copolymer and the polyethylene glycol of the hydrogel composition is about 10% to about 50%, and where the hydrogel composition is pumpable and settable up to a temperature of about 200° F. to about 450° F.

In some embodiments of the method, the hydrogel composition sets and forms a solid at a temperature of about 200° F. to about 450° F. In some embodiments, setting the hydrogel composition and forming the solid prevents or retards undesired loss or flow of wellbore fluid into the formation or construction; or the flow of formation fluids into the formation or construction.

In some embodiments of the method, the poly-alkene maleic anhydride copolymer has a weight-average molecular weight of about 40,000 Da to about 80,000 Da. In some embodiments, the poly-alkene maleic anhydride copolymer has a weight-average molecular weight of about 55,000 Da to about 65,000 Da.

In some embodiments of the method, the poly-alkene maleic anhydride copolymer is a poly-isobutylene maleic anhydride copolymer.

In some embodiments of the method, the poly-alkene maleic anhydride copolymer has a density of about 1.3 g/m$^3$, and 80% particle size distribution of 12-200 mesh.

In some embodiments of the method, the hydrogel composition comprises about 10% to about 30% poly-alkene maleic anhydride copolymer. In some embodiments, the hydrogel composition comprises about 20% poly-alkene maleic anhydride copolymer.

In some embodiments of the method, the polyethylene glycol has an average molecular weight of about 10,000 Da to about 30,000 Da. In some embodiments, the polyethylene glycol has an average molecular weight of about 20,000 Da.

In some embodiments of the method, the polyethylene glycol has a density of about 1.2 g/m$^3$.

In some embodiments of the method, the hydrogel composition comprises about 1% to about 20% polyethylene glycol. In some embodiments, the hydrogel composition comprises about 10% polyethylene glycol.

In some embodiments of the method, the viscosity of the hydrogel composition is water-thin. In some embodiments, the viscosity of the hydrogel composition is about 3500 to about 9000 mPa·s at 22° C. In some embodiments, the viscosity of the hydrogel composition is about 4000 to about 5500 mPa·s at 22° C.

In some embodiments of the method, the hydrogel composition further contains a crosslinker. In some embodiments, the crosslinker is selected from an ethyleneamine, a benzenetricarboxylic acid, a benzimidazole, and citric acid, and combinations thereof.

In some embodiments of the method, the contaminants are selected from the group consisting of acid, brine, diesel, and oil-based mud. In some embodiments, the hydrogel composition sets in the presence of up to about 50% (v/v) wellbore fluids contaminant.

In some embodiments of the method, the hydrogel composition contains about 10% to about 30% poly-isobutylene maleic anhydride copolymer having a weight-average molecular weight of about 55,000 Da to about 65,000 Da, a density of about 1.3 g/m$^3$, and 80% particle size distribution of 12-200 mesh; and about 1% to about 20% polyethylene glycol having an average molecular weight of about 10,000 Da to about 30,000 Da and a density of about 1.2 g/m$^3$. In some embodiments, the hydrogel composition further contains a crosslinker selected from an ethyleneamine, a benzenetricarboxylic acid, a benzimidazole, and citric acid, and combinations thereof.

Also provided in the present disclosure is a method of displacing hydrocarbons in production wells. In some embodiments, the method includes providing to the production well a hydrogel composition having a viscosity of about 2000 mPa·s to about 10,000 mPa·s at 22° C. In some embodiments, the composition contains a poly-alkene maleic anhydride copolymer; polyethylene glycol; and an aqueous carrier, where the total amount of the poly-alkene maleic anhydride copolymer and the polyethylene glycol of the hydrogel composition is about 10% to about 50%, and where the hydrogel composition is pumpable and settable up to a temperature of about 200° F. to about 450° F. In some embodiments, the method further includes setting the hydrogel composition to form a resin, thereby allowing the hydrocarbons in the production well to rise and be displaced. In some embodiments, the method is used in enhanced oil recovery (EOR).

In some embodiments of the method, the hydrogel composition contains about 10% to about 30% poly-isobutylene maleic anhydride copolymer having a weight-average molecular weight of about 55,000 Da to about 65,000 Da, a density of about 1.3 g/m$^3$, and 80% particle size distribution of 12-200 mesh; and about 1% to about 20% polyethylene glycol having an average molecular weight of about 10,000 Da to about 30,000 Da and a density of about 1.2 g/m$^3$.

In some embodiments of the method, the hydrogel composition further contains a crosslinker. In some embodiments, the crosslinker is selected from an ethyleneamine, a benzenetricarboxylic acid, a benzimidazole, and citric acid, and combinations thereof.

In some embodiments of the method, the hydrocarbons are diesel. In some embodiments, the hydrogel composition sets in the presence of up to about 50% (v/v) diesel.

DETAILED DESCRIPTION

Figure 1:
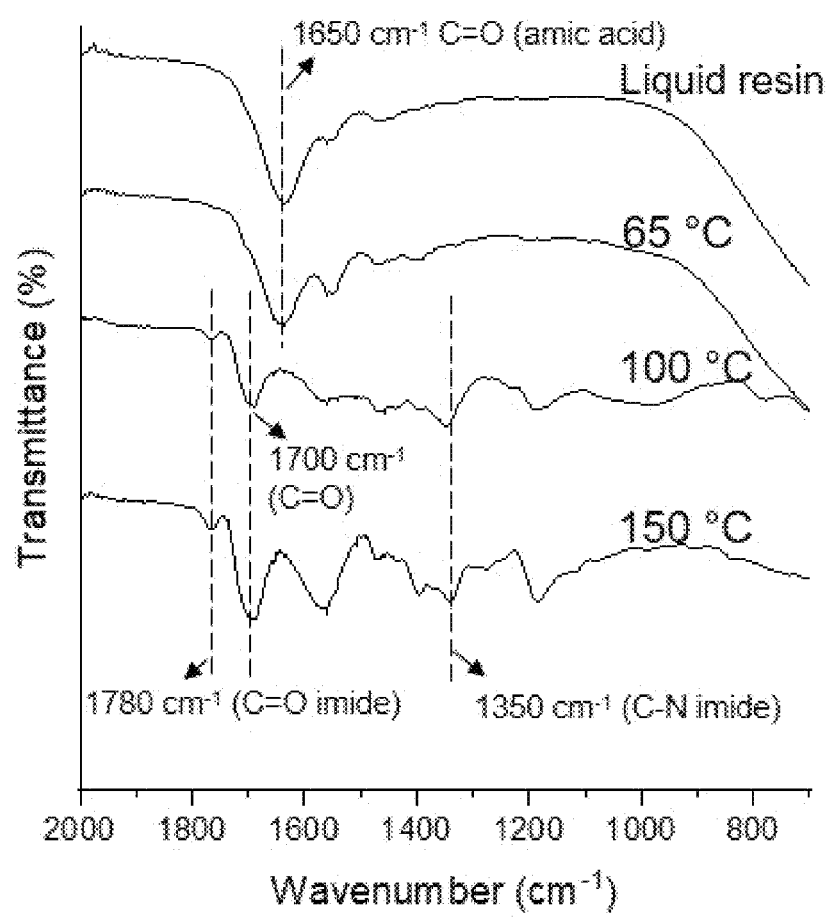
FIG. 1 is the FTIR spectra of imidization starting at 100° C. for an exemplary hydrogel composition. After condensation, the existence of a C—N bond and the C=O bond of the imide thermoset gel composite is seen at 1350 cm$^{-1}$ and 1780 cm$^{-1}$, respectively.

The hydrogel polymer used in the methods of the present disclosure can be applied as a water-thin, low-viscosity fluid, thereby facilitating penetration of the polymer into the smallest flaws, such as within a cement sheath. In some embodiments, at an engineered time and temperature, the fluid rapidly sets at a right-angle into a sealant gel to form a sealant that retards and prevents unfavorable loss or flow of wellbore fluids into the formation or formation fluids into the wellbore. In some embodiments, the soft, elastic, gummy-like water-based gel is designed to stretch and yield to strains downhole and not thermally degrade or soften at temperatures around 200° F. or higher. In some embodiments, thermoset structural development is accompanied by changes in rheological measurement. For example, the composition changes from a low-viscosity liquid, to a gel, and then to a stiff solid when cured at the desired temperature. In some embodiments, a consistometer is used to measure thermoset polymer viscoelasticity up to 100 Bc (Bearden units of consistency) as the reaction proceeds towards the cure point. The hydrogel polymer system of the present disclosure demonstrates robustness and reliability, in some embodiments after dilution by up to about 50%. In some embodiments, the hydrogel composition is diluted with a diluent that contains contaminants, such as diesel.

Because the hydrogel compositions described in this disclosure are designed for deepest possible penetration into microfractures and annuli to provide the best seal against unwanted fluid flow, the compositions can be used in any application where such a seal or gel is desired. In some embodiments, the gels are fully injectable. In some embodiments, once the gel sets, it retains desirable mechanical, thermal, and chemical properties, even under multiple harsh environments, such as, for example, high temperature, high pressure, corrosive chemicals, including acid, base, and brine, and other contaminants. In some embodiments, the hydrogel composition can be used at pressures of about 1,000 psi to about 3,000 psi. In some embodiments, the hydrogel composition can be used at room temperature up to a pressure of about 7,500 psi. In some embodiments, the hydrogel composition can be used at a temperature range of about 150° F. to about 450° F. In some embodiments, at lower temperatures, such as room temperature to about 150° F., the hydrogel composition serves as a water-thin carrying fluid for applications as a liquid flowable polymer. In some embodiments, at higher temperatures, the liquid polymer maintains fluidity with the removal of crosslinking agents (for example, TEPA, APBZ, TMA) to remain a liquid polymer.

The hydrogel compositions can also be used in other applications, including, but not limited to, as a loss circulation material, completion fluid, enhanced oil recovery solution, well control, and as a stimulating fluid. Outside of the oil and gas field, the hydrogel composition can be used in applications in biomedical fields, including, but not limited to, molding polymers for biotechnology, synthetic organs, fluid gels, carrier fluids, dispersed fluids and continuous fluids, and salt bridges. The hydrogel composition can also be used in applications in textiles, coatings, encapsulation, construction, and medicine.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

As used herein, the term "set" is intended to mean the process of becoming gelled to have an apparent viscoelasticity of at least 70 to 100 Bearden units of consistency (Bc). A substance is considered to be fluid at 1 to 40 Bc or less.

As used herein, a "settable" or "setting" fluid is a fluid that sets, is settable, or is adapted to set under certain design conditions.

As used herein, the "thickening time" is how long it takes for a setting well fluid to become unpumpable at a specified temperature and specified pressure. The pumpability of a setting well fluid is related to the consistency of the composition. The consistency of a setting fluid is measured in Bearden units of consistency (Bc), a dimensionless unit with no direct conversion factor to the more common units of viscosity. As used herein, a fluid is considered to be "pumpable" so long as the fluid has an apparent viscosity less than 70 Bc. A setting fluid becomes "unpumpable" when the consistency of the composition reaches at least 70 Bc.

Provided in the present disclosure are methods of using a hydrogel composition, where the hydrogel composition contains a poly-alkene maleic anhydride copolymer, polyethylene glycol (PEG), and an aqueous carrier. The hydrogel composition is a thermoset hydrogel sealant that can be applied as a water-thin, low viscosity fluid. In some embodiments, this allows for penetration into the smallest flaws. In some embodiments, the composition is fully injectable.

The hydrogel compositions used in the methods of the present disclosure demonstrate a number of desirable properties. In some embodiments, the hydrogel compositions exhibit high tolerance to hostile conditions, such as alkali conditions, extreme temperatures, and extreme pressure, such as high-temperature, high-pressure (HTHP) hostile conditions (3,000 psi, 250° F.); and high-alkali tolerance for cementing applications (no syneresis or buffer wash). In some embodiments, the hydrogel compositions exhibit high-acid tolerance (regains density even after 40-50% dilution with acid solution). In some embodiments, the hydrogel compositions exhibit high-brine tolerance (no change in right-angle setting of polymer, regardless of high % dilution). In some embodiments, the hydrogel compositions exhibit high-water tolerance (at least 10-30% dilution, gel elasticity, strength, and bonding to casing material remains). In some embodiments, the hydrogel compositions exhibit high-tolerance to oil-based environments and diesel, where right-angle setting of the polymer remains, regardless of high % dilution using diesel.

In some embodiments, the hydrogel composition used in the methods of the present disclosure contains a primary polymer and a secondary polymer. In some embodiments, the primary polymer is a poly-alkene maleic anhydride copolymer. In some embodiments, the poly-alkene maleic anhydride copolymer has a weight-average molecular weight of about 20,000 Da to about 100,000 Da, such as about 20,000 Da to about 95,000 Da, about 20,000 Da to about 90,000 Da, about 20,000 Da to about 85,000 Da, about 20,000 Da to about 80,000 Da, about 20,000 Da to about 75,000 Da, about 20,000 Da to about 70,000 Da, about 20,000 Da to about 65,000 Da, about 20,000 Da to about 60,000 Da, about 20,000 Da to about 55,000 Da, about 20,000 Da to about 50,000 Da, about 20,000 Da to about 45,000 Da, about 20,000 Da to about 40,000 Da, about 20,000 Da to about 35,000 Da, about 20,000 Da to about 30,000 Da, about 20,000 Da to about 25,000 Da, about 25,000 Da to about 100,000 Da, about 25,000 Da to about 95,000 Da, about 25,000 Da to about 90,000 Da, about 25,000 Da to about 85,000 Da, about 25,000 Da to about 80,000 Da, about 25,000 Da to about 75,000 Da, about 25,000 Da to about 70,000 Da, about 25,000 Da to about 65,000 Da, about 25,000 Da to about 60,000 Da, about 25,000 Da to about 55,000 Da, about 25,000 Da to about 50,000 Da, about 25,000 Da to about 45,000 Da, about 25,000 Da to about 40,000 Da, about 25,000 Da to about 35,000 Da, about 25,000 Da to about 30,000 Da, about 30,000 Da to about 100,000 Da, about 30,000 Da to about 95,000 Da, about 30,000 Da to about 90,000 Da, about 30,000 Da to about 85,000 Da, about 30,000 Da to about 80,000 Da, about 30,000 Da to about 75,000 Da, about 30,000 Da to about 70,000 Da, about 30,000 Da to about 65,000 Da, about 30,000 Da to about 60,000 Da, about 30,000 Da to about 55,000 Da, about 30,000 Da to about 50,000 Da, about 30,000 Da to about 45,000 Da, about 30,000 Da to about 40,000 Da, about 30,000 Da to about 35,000 Da, about 35,000 Da to about 100,000 Da, about 35,000 Da to about 95,000 Da, about 35,000 Da to about 90,000 Da, about 35,000 Da to about 85,000 Da, about 35,000 Da to about 80,000 Da, about 35,000 Da to about 75,000 Da, about 35,000 Da to about 70,000 Da, about 35,000 Da to about 65,000 Da, about 35,000 Da to about 60,000 Da, about 35,000 Da to about 55,000 Da, about 35,000 Da to about 50,000 Da, about 35,000 Da to about 45,000 Da, about 35,000 Da to about 40,000 Da, about 40,000 Da to about 100,000 Da, about 40,000 Da to about 95,000 Da, about 40,000 Da to about 90,000 Da, about 40,000 Da to about 85,000 Da, about 40,000 Da to about 80,000 Da, about 40,000 Da to about 75,000 Da, about 40,000 Da to about 70,000 Da, about 40,000 Da to about 65,000 Da, about 40,000 Da to about 60,000 Da, about 40,000 Da to about 55,000 Da, about 40,000 Da to about 50,000 Da, about 40,000 Da to about 45,000 Da, about 45,000 Da to about 100,000 Da, about 45,000 Da to about 95,000 Da, about 45,000 Da to about 90,000 Da, about 45,000 Da to about 85,000 Da, about 45,000 Da to about 80,000 Da, about 45,000 Da to about 75,000 Da, about 45,000 Da to about 70,000 Da, about 45,000 Da to about 65,000 Da, about 45,000 Da to about 60,000 Da, about 45,000 Da to about 55,000 Da, about 45,000 Da to about 50,000 Da, about 50,000 Da to about 100,000 Da, about 50,000 Da to about 95,000 Da, about 50,000 Da to about 90,000 Da, about 50,000 Da to about 85,000 Da, about 50,000 Da to about 80,000 Da, about 50,000 Da to about 75,000 Da, about 50,000 Da to about 70,000 Da, about 50,000 Da to about 65,000 Da, about 50,000 Da to about 60,000 Da, about 50,000 Da to about 55,000 Da, about 55,000 Da to about 100,000 Da, about 55,000 Da to about 95,000 Da, about 55,000 Da to about 90,000 Da, about 55,000 Da to about 85,000 Da, about 55,000 Da to about 80,000 Da, about 55,000 Da to about 75,000 Da, about 55,000 Da to about 70,000 Da, about 55,000 Da to about 65,000 Da, about 55,000 Da to about 60,000 Da, about 60,000 Da to about 100,000 Da, about 60,000 Da to about 95,000 Da, about 60,000 Da to about 90,000 Da, about 60,000 Da to about 85,000 Da, about 60,000 Da to about 80,000 Da, about 60,000 Da to about 75,000 Da, about 60,000 Da to about 70,000 Da, about 60,000 Da to about 65,000 Da, about 65,000 Da to about 100,000 Da, about 65,000 Da to about 95,000 Da, about 65,000 Da to about 90,000 Da, about 65,000 Da to about 85,000 Da, about 65,000 Da to about 80,000 Da, about 65,000 Da to about 75,000 Da, about 65,000 Da to about 70,000 Da, about 70,000 Da to about 100,000 Da, about 70,000 Da to about 95,000 Da, about 70,000 Da to about 90,000 Da, about 70,000 Da to about 85,000 Da, about 70,000 Da to about 80,000 Da, about 70,000 Da to about 75,000 Da, about 75,000 Da to about 100,000 Da, about 75,000 Da to about 95,000 Da, about 75,000 Da to about 90,000 Da, about 75,000 Da to about 85,000 Da, about 75,000 Da to about 80,000 Da, about 80,000 Da to about 100,000 Da, about 80,000 Da to about 95,000 Da, about 80,000 Da to about 90,000 Da, about 80,000 Da to about 85,000 Da, about 85,000 Da to about 100,000 Da, about 85,000 Da to about 95,000 Da, about 85,000 Da to about 90,000 Da, about 90,000 Da to about 100,000 Da, about 90,000 Da to about 95,000 Da, about 95,000 Da to about 100,000 Da, or about 20,000 Da, about 25,000 Da, about 30,000 Da, about 35,000 Da, about 40,000 Da, about 45,000 Da, about 50,000 Da, about 55,000 Da, about 60,000 Da, about 65,000 Da, about 70,000 Da, about 75,000 Da, about 80,000 Da, about 85,000 Da, about 90,000 Da, about 95,000 Da, or about 100,000 Da. In some embodiments, the poly-alkene maleic anhydride copolymer has a weight-average molecular weight of about 55,000 Da to about 65,000 Da. In some embodiments, the poly-alkene maleic anhydride copolymer is a poly-butylene maleic anhydride copolymer. In some embodiments, the poly-alkene maleic anhydride copolymer is a poly-isobutylene maleic anhydride copolymer. Exemplary poly-alkene maleic anhydride copolymers include, but are not limited to, the ISOBAM™ polymers, which are alkaline hydrosoluble copolymers of isobutylene and maleic anhydride. In some embodiments, the poly-alkene maleic anhydride copolymer is ISOBAM™-104, having a weight-average molecular weight of about 55,000 Da to about 65,000 Da, a density of 1.3 g/cm³, and 80% particle size distribution of 12-200 mesh. In some embodiments, the poly-alkene maleic anhydride copolymer is a salt. In some embodiments, the poly-alkene maleic anhydride copolymer is an amide-ammonium salt.

In some embodiments, the hydrogel composition used in the methods of the present disclosure contains a primary polymer and a secondary polymer. In some embodiments, the secondary polymer is a polyethylene glycol (PEG). In some embodiments, the PEG has an average molecular weight of about 1,000 Da to about 100,000 Da, such as about 1,000 Da to about 90,000 Da, about 1,000 Da to about 80,000 Da, about 1,000 Da to about 70,000 Da, about 1,000 Da to about 60,000 Da, about 1,000 Da to about 50,000 Da, about 1,000 Da to about 40,000 Da, about 1,000 Da to about 30,000 Da, about 1,000 Da to about 20,000 Da, about 1,000 Da to about 10,000 Da, about 10,000 Da to about 100,000 Da, about 10,000 Da to about 90,000 Da, about 10,000 Da to about 80,000 Da, about 10,000 Da to about 70,000 Da, about 10,000 Da to about 60,000 Da, about 10,000 Da to about 50,000 Da, about 10,000 Da to about 40,000 Da, about 10,000 Da to about 30,000 Da, about 10,000 Da to about 20,000 Da, about 20,000 Da to about 100,000 Da, about 20,000 Da to about 90,000 Da, about 20,000 Da to about 80,000 Da, about 20,000 Da to about 70,000 Da, about 20,000 Da to about 60,000 Da, about 20,000 Da to about 50,000 Da, about 20,000 Da to about 40,000 Da, about 20,000 Da to about 30,000 Da, about 30,000 Da to about 100,000 Da, about 30,000 Da to about 90,000 Da, about 30,000 Da to about 80,000 Da, about 30,000 Da to about 70,000 Da, about 30,000 Da to about 60,000 Da, about 30,000 Da to about 50,000 Da, about 30,000 Da to about 40,000 Da, about 40,000 Da to about 100,000 Da, about 40,000 Da to about 90,000 Da, about 40,000 Da to about 80,000 Da, about 40,000 Da to about 70,000 Da, about 40,000 Da to about 60,000 Da, about 40,000 Da to about 50,000 Da, about 50,000 Da to about 100,000 Da, about 50,000 Da to about 90,000 Da, about 50,000 Da to about 80,000 Da, about 50,000 Da to about 70,000 Da, about 50,000 Da to about 60,000 Da, about 60,000 Da to about 100,000 Da, about 60,000 Da to about 90,000 Da, about 60,000 Da to about 80,000 Da, about 60,000 Da to about 70,000 Da, about 70,000 Da to about 100,000 Da, about 70,000 Da to about 90,000 Da, about 70,000 Da to about 80,000 Da, about 80,000 Da to about 100,000 Da, about 80,000 Da to about 90,000 Da, about 90,000 Da to about 100,000 Da, or about 10,000 Da, about 15,000 Da, about 20,000 Da, about 25,000 Da, about 30,000 Da, about 35,000 Da, about 40,000 Da, about 45,000 Da, about 50,000 Da, about 55,000 Da, about 60,000 Da, about 65,000 Da, about 70,000 Da, about 75,000 Da, about 80,000 Da, about 85,000 Da, about 90,000 Da, about 95,000 Da, or about 100,000 Da. In some embodiments, the PEG has an average molecular weight of about 10,000 Da to about 30,000 Da. In some embodiments, the PEG has an average molecular weight of about 20,000 Da. In some embodiments, the PEG has an average molecular weight of about 20,000 Da, a density of 1.2 g/cm³, and is highly water soluble.

In some embodiments, hydrogel compositions used in the methods of the present disclosure are fully injectable polymer liquids. In some embodiments, the total polymer content of the hydrogel composition is about 10% to about 50%, such as about 10% to about 45%, about 10% to about 40%, about 10% to about 35%, about 10% to about 30%, about 10% to about 25%, about 10% to about 20%, about 10% to about 15%, about 15% to about 50%, about 15% to about 45%, about 15% to about 40%, about 15% to about 35%, about 15% to about 30%, about 15% to about 25%, about 15% to about 20%, about 20% to about 50%, about 20% to about 45%, about 20% to about 40%, about 20% to about 35%, about 20% to about 30%, about 20% to about 25%, about 25% to about 50%, about 25% to about 45%, about 25% to about 40%, about 25% to about 35%, about 25% to about 30%, about 30% to about 50%, about 30% to about 45%, about 30% to about 40%, about 30% to about 35%, about 35% to about 50%, about 35% to about 45%, about 35% to about 40%, about 40% to about 50%, about 40% to about 45%, or about 45% to about 50%, such as about 10%, about 15%, about 20%, about 25%, about 30%, about 35%, about 40%, about 45%, or about 50%.

In some embodiments, the total polymer content of the hydrogel composition used in the methods of the present disclosure includes a primary polymer component and a secondary polymer component. In some embodiments, the total polymer content is about 10% to about 50%, where the primary polymer component is about 10% to about 30%, about 15% to about 25%, or about 20%, and the secondary polymer component is about 1% to about 20%, about 5% to about 15%, or about 10%. In some embodiments, the primary polymer component is about 20%. In some embodiments, the secondary polymer component is about 10%. In some embodiments, the primary polymer component is a poly-alkene maleic anhydride copolymer. In some embodiments, the primary polymer component is poly-isobutylene maleic anhydride, such as poly-isobutylene maleic anhydride having a weight-average molecular weight of about 55,000 Da to about 65,000 Da, a density of 1.3 g/cm³, and 80% particle size distribution of 12-200 mesh. In some embodiments, the secondary polymer component is polyethylene glycol, such as polyethylene glycol having an average molecular weight of about 20,000 Da, a density of 1.2 g/cm³, and is highly water soluble.

The chemical activity (a) determination corresponds to the available part of components in the hydrogel composition. In some embodiments, the active polymer content of the primary polymer (for example, the poly-alkene maleic anhydride copolymer) is α=0.03-1.0, α=0.2-0.8, α=0.3-0.6, or α=0.4-0.5. In some embodiments, α=0.4-0.45. In some embodiments, α=0.43. In some embodiments, solubility increases, and the hydrogel composition becomes fully injectable with a polymer load of about 30%. In some embodiments, α is greater than 0.4 and the hydrogel composition has water-thin viscosity and a high polymer load, such as about 30% or greater.

The hydrogel compositions used in the methods of the present disclosure contain an aqueous carrier. In some embodiments, the aqueous carrier includes water, brine, produced water, flowback water, brackish water, Arab-D-brine, sea water, or combinations thereof. In some embodiments, the aqueous carrier is about 1% to about 99% by weight of the hydrogel composition. In some embodiments, the aqueous carrier is about 5% to about 99% by weight of the hydrogel composition. For example, the aqueous carrier can be about 10% to about 98%, about 20% to about 98%, about 30% to about 98%, about 40% to about 98%, about 50% to about 98%, about 60% to about 98%, about 70% to about 98%, about 80% to about 98%, or about 85% to about 98% by weight of the hydrogel composition, or about 10%, about 20%, about 30%, about 40%, about 50%, about 60%, about 70%, about 80%, about 85%, about 90%, about 91%, about 92%, about 93%, about 94%, about 95%, about 96%, about 97%, about 98%, or about 99% by weight of the hydrogel composition. In some embodiments, the aqueous carrier is about 70% to about 80% by weight of the hydrogel composition. In some embodiments, the aqueous carrier is about 60% to about 65% by weight of the hydrogel composition. In some embodiments, the aqueous carrier is water. Because water begins to boil at about 212° F. (its boiling point), water-based systems typically have a temperature limit. The hydrogel compositions of the present disclosure, however, can be used at temperatures above the boiling point of the solvent (water) due to the robustness of the compositions. The hydrogel compositions of the present disclosure set uniformly and with mechanical strength at elevated temperatures. In some embodiments, the hydrogel compositions are used in applications at temperatures of about 200° F. to about 400° F., such as about 200° F., about 250° F., about 300° F., about 350° F., or about 400° F.

In some embodiments, the hydrogel compositions used in the methods of the present disclosure contain a crosslinker. Exemplary crosslinkers include, but are not limited to, ethyleneamines, benzenetricarboxylic acids, benzimidazoles, citric acid, and combinations thereof. In some embodiments, the hydrogel composition includes reaction products of the poly-alkene maleic anhydride copolymer and one or more crosslinkers. In some embodiments, the composition includes reaction products of a poly-butene maleic anhydride copolymer. In some embodiments, the composition includes reaction products of a poly-isobutylene maleic anhydride copolymer.

In some embodiments, the crosslinker contains an ethyleneamine. In some embodiments, the ethyleneamine is selected from ethylenediamine (EDA), diethylenetriamine (DETA), aminoethylpiperazine (AEP), triethylenetetraamine (linear-TETA), tris(2-aminoethyl)amine (branched-TETA), N,N'-bis-(2-aminoethyl)piperazine (bis-AEP), N-[(2-aminoethyl)2-aminoethyl]piperazine), piperazinoethylethylenediamine (PEEDA), tetraethylenepentamine (TEPA), and mixtures thereof. In some embodiments, the ethyleneamine is TEPA.

In some embodiments, the crosslinker contains a benzenetricarboxylic acid. In some embodiments, the benzenetricarboxylic acid is selected from 1,2,3-benzenetricarboxylic acid (hemimellitic acid), 1,2,4-benzenetricarboxylic acid (trimellitic acid), 1,3,5-benzenetricarboxylic acid (trimesic acid), and mixtures thereof. In some embodiments, the benzenetricarboxylic acid is trimesic acid.

In some embodiments, the crosslinker contains a benzimidazole. Benzimidazoles can be used to facilitate anionic polymerization and serve as a co-curing agent, along with a trifunctional monomer. These highly aromatic monomers can yield a resin with higher heat resistance once the gel cures. In some embodiments, the benzimidazole is a substituted benzimidazole. In some embodiments, the benzimidazole is a phenylbenzimidazole having the following structure:

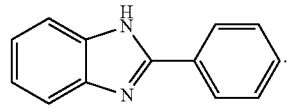 [SMILES: c1ccc(-c2nc3ccccc3[nH]2)cc1]

In some embodiments, the phenylbenzimidazole is a substituted phenylbenzimidazole, wherein one or more substituents are present at any of the open positions. In some embodiments, the phenylbenzimidazole is substituted with one or more of —OH, —OR, —NH₂, —NHR, —NR₂, —NHCOR, —SH, —SR, —SeR, —Cl, —Br, —I, —F, —CN, and —CO₂R, and combinations thereof, wherein R represents an alkyl group. In some embodiments, the phenylbenzimidazole is substituted with one or more —NH₂ groups. In some embodiments, the phenylbenzimidazole is substituted with two —NH₂ groups. In some embodiments, the benzimidazole has at least two, such as two, three, or four nucleophilic groups, for example, —NH$_2$ groups, and allows for the nucleophilic attack on electrophiles to form many crosslinking bonds between the individual components of the compositions of the present disclosure. In some embodiments, the electrophile is a benzenetricarboxylic acid. In some embodiments, the benzenetricarboxylic acid is trimesic acid. In some embodiments, the benzimidazole is 5-amino-2-(4-aminophenyl)benzimidazole (APBZ).

Examples of suitable benzimidazoles include, but are not limited to, 6-bromo-4-azabenzimidazole, 4-azabenzimidazole, 5-azabenzimidazole, 2-bromo-1H-benzimidazole, 6-bromo-1H-benzimidazole, 5-bromo-1,3-dihydrobenzoimidazol-2-one, 2-chlorobenzimidazole, 5-chlorobenzimidazole, 5,6-dichloro-1H-benzimidazole hydrochloride, 5-fluoro-1H-benzimidazole, 2-mercapto-5-benzimidazolesulfonic acid sodium salt dihydrate, 2-mercapto-5-nitrobenzimidazole, 5-nitro-2-benzimidazolinone, benzimidazole, 1H-benzoimidazol-4-ol, 2-hydroxybenzimidazole, 1H-benzimidazole-2-sulfonic acid, 2-mercaptobenzimidazole, 1-aminobenzimidazole, 2-aminobenzimidazole, 5-aminobenzimidazole, 6-aminobenzimidazole, 5-amino-1,3-dihydro-2H-benzimidazol-2-one, 5-amino-2-mercaptobenzimidazole, 5,6-diamino-1,3-dihydro-2H-benzimidazol-2-one, cis-octahydro-2H-benzimidazol-2-one, 4-chloro-2-(trifluoromethyl)benzimidazole, 5-chloro-2-(trichloromethyl)benzimidazole, 6-chloro-1H-benzimidazole-2-carboxylic acid monohydrate, 5-cyanobenzimidazole, 5-(difluoromethoxy)-2-mercapto-1H-benzimidazole, 5-amino-2-(trifluoromethyl)benzimidazole, 1H-benzimidazole-2-carboxylic acid, 1H-benzimidazole-2-carboxylic acid monohydrate, 1H-benzimidazole-6-carboxylic acid, 5-benzimidazolecarboxylic acid, 2-mercapto-1H-benzimidazole-6-carboxylic acid, 2-sulfanyl-1H-benzimidazole-5-carboxylic acid, 6-bromo-1-methyl-1H-benzo[d]imidazole, 2-(chloromethyl)benzimidazole, (5-chloro-1H-benzimidazol-2-yl)methanol, (5-chloro-1H-benzimidazol-2-yl)methylamine dihydrochloride, 1-methylbenzimidazole, 2-methylbenzimidazole, 5-methylbenzimidazole, 1H-benzimidazol-5-ylmethanol, 2-benzimidazolemethanol, 5-methoxybenzimidazole, 5-methoxy-2-benzimidazolethiol, 1-methyl-1H-benzimidazole-2-thiol, 2-(methylthio)benzimidazole, 1H-benzimidazol-2-ylmethanethiol hydrochloride, 1-methyl-1H-benzimidazol-6-amine, 2-(aminomethyl)benzimidazole dihydrochloride, 2-amino-1-methylbenzimidazole, 5-methyl-1H-benzimidazol-2-amine, 5-amino-6-methoxy-1,3-dihydro-2H-benzimidazol-2-one, 1-(methylsulfonyl)-1H-benzimidazol-2-amine, 2-guanidinobenzimidazole, (5-amino-1H-benzimidazol-2-yl)methanol dihydrochloride, (2-benzimidazolyl)acetonitrile, 4-(1H-benzimidazol-2-yl)-1,2,5-oxadiazol-3-ylamine, 2-(2-chloro-1H-benzimidazol-1-yl)ethanol, 2-(6-chloro-1H-benzimidazol-2-yl)ethanol, carbendazim, 1-(2-bromoethyl)-1H-benzimidazole hydrobromide, 2-(chloromethyl)-6-methyl-1H-benzimidazole hydrochloride, 5,6-dimethylbenzimidazole, (6-methoxy-1H-benzimidazol-2-yl)methanol, 5,6-dimethoxybenzimidazole, 2-(1H-benzoimidazol-2-yl)-ethylamine, 2-(2-aminoethyl)benzimidazole dihydrochloride, 5,6-dimethyl-1H-benzimidazol-7-amine, hydrochloride, 1-(4-methyl-1H-benzimidazol-2-yl)methanamine dihydrochloride, 1-(5-methyl-1H-benzimidazol-2-yl)methanamine dihydrochloride, 4,5-dimethyl-1H-benzimidazol-6-amine dihydrochloride, 1-(5-methoxy-1H-benzimidazol-2-yl)methanamine dihydrochloride, 2-(5-amino-1H-benzimidazol-1-yl)ethanol dihydrochloride, 1-ethyl-2-hydrazino-1H-benzimidazole hydrate, 5-hydroxythiabendazole, 2-[2-(trifluoromethyl)-1H-benzimidazol-1-yl]ethanol, 2-methoxycarbonylamino-1H-benzoimidazole-6-carboxylic, acid, 1-(1-methyl-1H-benzimidazol-2-yl)ethanone, 1-isopropenyl-2-benzimidazolidinone, 1,2-dimethyl-1H-benzimidazole-5-carboxylic acid, 2-benzimidazolepropionic acid, 1-(3-chloropropyl)-1,3-dihydro-2h-benzimidazol-2-one, 2-(1H-benzimidazol-1-yl)propanoic acid hydrochloride, 1-(5,6-dimethyl-1H-benzimidazol-2-yl)methanamine, 2-ethyl-1-methyl-1H-benzoimidazol-5-ylamine, 3-(1H-benzimidazol-1-yl)propan-1-amine, 2-(3-aminopropyl)-1H-benzimidazol-5-ol, 1-(5-methyl-1H-benzimidazol-2-yl)ethanamine dihydrochloride, 2-(1-methyl-1H-benzimidazol-2-yl)ethanamine dihydrochloride, 2-(5-methyl-1H-benzimidazol-2-yl)ethanamine dihydrochloride, 2-(7-methyl-1H-benzimidazol-2-yl)ethanamine dihydrochloride, 2-isopropyl-1H-benzimidazol-5-amine dihydrochloride, N-methyl-1-(5-methyl-1H-benzimidazol-2-yl)methanamine dihydrochloride, 1-allyl-1H-benzimidazole-2-carbaldehyde, 1-isopropyl-1H-benzimidazole-2-carbaldehyde, (5,7-dimethyl-1H-benzimidazol-2-yl)acetic acid, (4-methyl-1H-benzoimidazol-2-ylmethoxy)acetic acid, [2-(methoxymethyl)-1H-benzimidazol-1-yl]acetic acid, 3-(5-methyl-1H-benzimidazol-2-yl)propan-1-ol, 1-isobutyl-1H-benzimidazol-2-amine, 2-tert-butyl-1H-benzimidazol-5-amine, 2-methyl-1-propyl-1H-benzimidazol-5-amine dihydrochloride, 3-(1-methyl-1H-benzimidazol-2-yl)-1-propanamine dihydrochloride hydrate, 5-(1H-benzoimidazol-2-ylsulfanyl)-furan-2-carbaldehyde, 2-(2-pyridyl)benzimidazole, 2-(3-pyridyl)-1H-benzimidazole, 4-[2-(trifluoromethyl)-1H-benzimidazol-1-yl]butanoic acid, 2-(2-ethyl-benzoimidazol-1-yl)-propionic acid, 3-(5,7-dimethyl-1H-benzimidazol-2-yl)propanoic acid, 2-piperidin-3-yl-1H-benzimidazole, 4-(2-keto-1-benzimidazolinyl)piperidine, oxibendazole, 1-(piperidin-3-yl)-1H-benzo[d]imidazole hydrochloride, 2-(2-bromophenyl)-1H-benzimidazole, 2-(2-chlorophenyl)benzimidazole, 2-phenylbenzimidazole, 2-(2-hydroxyphenyl)-1H-benzimidazole, 2-phenyl-5-benzimidazolesulfonic acid, 2-(2-aminophenyl)-1H-benzimidazole, 4-(1H-benzimidazol-1-yl)aniline, N-(1H-benzoimidazol-2-yl)-benzene-1,2-diamine, 2-(piperidin-3-ylmethyl)-1H-benzimidazole, 4-methyl-2-piperidin-3-yl-1H-benzimidazole dihydrochloride, 2-(2-bromophenyl)-1H-benzoimidazole-5-carboxylic acid, 2-chloro-1-(4-fluorobenzyl)benzimidazole, 4-(1H-1,3-benzimidazol-1-yl)benzenecarbaldehyde, 3-(1H-benzoimidazol-2-yl)-benzoic acid, 2-(2-bromophenyl)-1-methyl-1H-benzimidazole, 2-benzenesulfonylmethyl-1H-benzoimidazole, 1-benzyl-1H-benzoimidazol-2-ylamine, 2-benzyl-1H-benzimidazol-5-amine, methyl 1-(butylcarbamoyl)-2-benzimidazolecarbamate, fenbendazole, 2-ferrocenyl-benzimidazole, 2-ferrocenyl-6-methylbenzimidazole, 2-[3-(2-benzimidazolyl)-phenyl]-5-methyl-4-phenyl-thiazole, 2-[3-(2-benzimidazolyl)-phenyl)-4-phenylthiazole, 2-[4-(2-benzimidazolyl)-phenyl]-4-phenylthiazole, 2-[4-(2-benzimidazolyl)-phenyl]-5-methyl-4-phenyl-thiazole, 6-methyl-2-(2-thienyl)benzimidazole, and ethyl 2-[4-(2-benzimidazolyl)-phenyl]-4-methylthiazole-5-carboxylate.

In some embodiments, the benzimidazole is 5-amino-2-(4-aminophenyl)benzimidazole (APBZ).

In some embodiments of the hydrogel compositions used in the methods of the present disclosure, the crosslinker contains citric acid.

In some embodiments of the hydrogel compositions used in the methods of the present disclosure, the crosslinker contains an ethyleneamine, a benzenetricarboxylic acid, a benzimidazole, and citric acid. In some embodiments, the crosslinker contains TEPA, trimesic acid, APBZ, and citric acid.

In some embodiments of the hydrogel compositions used in the methods of the present disclosure, the crosslinker contains an ethyleneamine, a benzenetricarboxylic acid, and a benzimidazole. In some embodiments, the crosslinker contains TEPA, trimesic acid, and APBZ.

Without wishing to be bound by any theory, it is believed that the formation of a polyaramide system (a polymer containing aromatic amides), such as formed by crosslinking the poly-alkene maleic anhydride copolymer, PEG, and crosslinker containing an ethyleneamine, a benzenetricarboxylic acid, a benzimidazole, and combinations thereof, allows for increased ductility and enhanced performance of a sealant resin that is thermally stable up to at least 400° F.

This is made possible by the high polymer density, crosslinking, and elasticity of the resin. The hydrogel compositions used in the methods of the present disclosure also remain water-thin to allow for high-volume application.

Without wishing to be bound by any theory, it is believed that the crosslinker, for example, a crosslinker containing an amine (—NHR), reacts first with the maleic anhydride moiety of the copolymer, followed by reaction of any free maleic anhydride with the —OH of the PEG. Thus, in some embodiments, PEG acts as a scaffold and then as a crosslinker, if permitted. In some embodiments, the maleic anhydride converts to maleimide, and any free amine reacts with the PEG. This can further increase the overall crosslinking of the resin, which can increase the strength of the resin. This is especially true as the resin sets at higher temperatures and drives the production of maleimide.

In some embodiments, the hydrogel compositions used in the methods of the present disclosure include a poly-alkene maleic anhydride copolymer, a polyethyleneglycol (PEG), and a crosslinker selected from an ethyleneamine, a benzenetricarboxylic acid, a benzimidazole, and combinations thereof, where the poly-alkene maleic anhydride copolymer includes repeat units I and II:

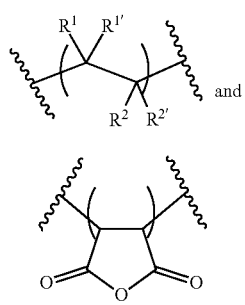

where $R^1$, $R^{1'}$, $R^2$, and $R^{2'}$ are each independently selected from —H and —($C_1$-$C_5$)alkyl. Exemplary hydrogel compositions include those disclosed in U.S. application Ser. No. 16/930,027, which is herein incorporated by reference in its entirety.

In some embodiments, the hydrogel compositions used in the methods of the present disclosure contain one or more additional components, including, but not limited to a pH adjuster, a gel time control agent, and combinations thereof.

In some embodiments, the hydrogel compositions used in the methods of the present disclosure contain a pH adjuster. Examples of suitable pH adjusters include, but are not limited to, an organic amine, hydrochloric acid, ammonium hydroxide, sodium hydroxide, sodium carbonate, sodium hydrogen carbonate, sodium monohydrogen phosphate, sodium dihydrogen phosphate, ammonium hydrogen carbonate, and aqueous ammonia. In some embodiments, the pH adjuster is sodium hydroxide (NaOH).

In some embodiments, the hydrogel compositions used in the methods of the present disclosure contain a gel time control agent. The gel time control agent can accelerate or retard the crosslinking of the poly-alkene maleic anhydride copolymer and the crosslinker and thus can accelerate or retard the gelling of the composition. Suitable gel time control agents include, but are not limited to, salts that yield a basic solution when dissolved in water, salts that yield an acidic solution when dissolved in water, uncharged organic molecules that yield a basic solution when dissolved in water, uncharged organic molecules that yield an acidic solution when dissolved in water (for example, citric acid), and pH buffers. Salts and uncharged organic molecules that yield a basic solution when dissolved in water, such as sodium hexametaphosphate, sodium bicarbonate, sodium carbonate, sodium tetraborate, trisodium phosphate (TSP) ($Na_3PO_4$), monoethanolamine, triethanolamine, and N,N-dimethyl ethylene diamine, can retard the gel time (decelerate gelling) of the composition. Salts and uncharged organic molecules that yield an acidic solution when dissolved in water, such as the pentasodium salt of amino tri(methylene phosphonic acid), sodium acid pyrophosphate, disodium hydrogen phosphate, sodium dihydrogen phosphate, sodium hydrogen sulfate, and monosodium citrate, can shorten the gel time (accelerate gelling) of the composition. Buffers prepared from Bronsted acids and Bronsted bases, such as citric acid and sodium hydroxide, or Bronsted acids and Lewis bases, such as citric acid and monoethanolamine, and buffers produced from Lewis acids and Lewis bases, such as boric acid and monoethanolamine, can retard or accelerate the gel time of the composition. As such, compositions can be formulated with a buffer to achieve a gel time suitable for specific downhole requirements. Other examples of suitable Bronsted acids include mineral acids such as hydrochloric acid, sulfuric acid, phosphoric acid, and nitric acid, and organic acids such as tartaric acid and benzene sulfonic acid, and methane sulfonic acid. Other examples of Bronsted bases include sodium carbonate, sodium bicarbonate, potassium hydroxide, and ammonium hydroxide. Other examples of Lewis bases include diethanolamine, triethanolamine, triisopropanolamine, and dimethylaminoethanol. In some embodiments, the gel time control agent accelerates the crosslinking reaction and therefore accelerates formation of the gel from the maleic anhydride and the crosslinker. In some aspects of these embodiments, the acceleration occurs in the absence of set cement. In other aspects of these embodiments, the acceleration occurs in the presence of set cement. In some embodiments, the gel time control agent retards the crosslinking reaction, and therefore retards formation of the gel from the maleic anhydride and the crosslinker. In some aspects of these embodiments, the retardation of the crosslinking reaction occurs in the absence of set cement. In other aspects of these embodiments, the retardation of the crosslinking reaction occurs in the presence of set cement. In some embodiments, the compositions contain citric acid. In some embodiments, the compositions contain trisodium phosphate (TSP). In some embodiments, the compositions contain citric acid and TSP. When a gel time control agent is present in the compositions of the present disclosure, the total amount of gel time control agent is about 0.01 wt % to about 0.5 wt %.

The hydrogel compositions used in the methods of the present disclosure maintain a water-thin rheology, which allows for application into the smallest flaws and openings.

In some embodiments, the hydrogel compositions of the present disclosure have a water-thin viscosity of about 2000 mPa·s to about 10,000 mPa·s at 22° C., for example, about 2000 mPa·s to about 9000 mPa·s, about 2000 mPa·s to about 8000 mPa·s, about 2000 mPa·s to about 7000 mPa·s, about 2000 mPa·s to about 6000 mPa·s, about 2000 mPa·s to about 5000 mPa·s, about 2000 mPa·s to about 4000 mPa·s, about 2000 mPa·s to about 3500 mPa·s, about 2000 mPa·s to about 3000 mPa·s, about 3000 mPa·s to about 10,000 mPa·s, about 3000 mPa·s to about 9000 mPa·s, about 3000 mPa·s to about 8000 mPa·s, about 3000 mPa·s to about 7000 mPa·s, about 3000 mPa·s to about 6000 mPa·s, about 3000 mPa·s to about 5000 mPa·s, about 3000 mPa·s to about 4000 mPa·s, about 3000 mPa·s to about 3500 mPa·s, about 3500 mPa·s to about 10,000 mPa·s, about 3500 mPa·s to about 9000 mPa·s, about 3500 mPa·s to about 8000 mPa·s, about 3500 mPa·s to about 7000 mPa·s, about 3500 mPa·s to about 6000 mPa·s, about 3500 mPa·s to about 5000 mPa·s, about 3500 mPa·s to about 4000 mPa·s, about 4000 mPa·s to about 10,000 mPa·s, about 4000 mPa·s to about 9000 mPa·s, about 4000 mPa·s to about 8000 mPa·s, about 4000 mPa·s to about 7000 mPa·s, about 4000 mPa·s to about 6000 mPa·s, about 4000 mPa·s to about 5000 mPa·s, about 5000 mPa·s to about 10,000 mPa·s, about 5000 mPa·s to about 9000 mPa·s, about 5000 mPa·s to about 8000 mPa·s, about 5000 mPa·s to about 7000 mPa·s, about 5000 mPa·s to about 6000 mPa·s, about 6000 mPa·s to about 10,000 mPa·s, about 6000 mPa·s to about 9000 mPa·s, about 6000 mPa·s to about 8000 mPa·s, about 6000 mPa·s to about 7000 mPa·s, about 7000 mPa·s to about 10,000 mPa·s, about 7000 mPa·s to about 9000 mPa·s, about 7000 mPa·s to about 8000 mPa·s, about 8000 mPa·s to about 10,000 mPa·s, about 8000 mPa·s to about 9000 mPa·s, or about 9000 mPa·s to about 10,000 mPa·s, or about 2000 mPa·s, about 3000 mPa·s, about 3500 mPa·s, about 4000 mPa·s, about 5000 mPa·s, about 6000 mPa·s, about 7000 mPa·s, about 8000 mPa·s, about 9000 mPa·s, or about 10,000 mPa·s at 22° C. In some embodiments, the viscosity of the hydrogel composition is about 3500 to about 9000 mPa·s at 22° C. In some embodiments, the viscosity of the hydrogel composition is about 3000 to about 5000 mPa·s at 22° C. In some embodiments, the viscosity of the hydrogel composition is about 4000 to about 5500 mPa·s at 22° C. In some embodiments, the viscosity of the hydrogel composition is about 5000 mPa·s at 22° C.

In some embodiments, the density of the cured hydrogel composition is greater than about 1.10 g/cm$^3$, such as between about 1.11 g/cm$^3$ and about 1.50 g/cm$^3$. In some embodiments, the density of the cured hydrogel composition is about 1.11 g/cm$^3$, 1.12 g/cm$^3$, 1.13 g/cm$^3$, 1.14 g/cm$^3$, 1.15 g/cm$^3$, 1.16 g/cm$^3$, 1.17 g/cm$^3$, 1.18 g/cm$^3$, 1.19 g/cm$^3$, 1.2 g/cm$^3$, 1.25 g/cm$^3$, 1.3 g/cm$^3$, 1.35 g/cm$^3$, 1.4 g/cm$^3$, 1.45 g/cm$^3$, or 1.5 g/cm$^3$. In some embodiments, the density of the cured hydrogel composition is about 1.15 g/cm$^3$.

In some embodiments, the hydrogel composition used in the methods of the present disclosure has an elasticity of greater than about 2000 N/m, such as between about 2000 N/m and about 10,000 N/m. In some embodiments, the elasticity of the cured hydrogel composition is about 2000 N/m, about 2500 N/m, about 2800 N/m, about 3000 N/m, about 3400 N/m, about 4000 N/m, about 4500 N/m, about 5000 N/m, about 5500 N/m, about 6000 N/m, about 6100 N/m, about 6500 N/m, about 7000 N/m, about 8000 N/m, about 9000 N/m, or about 10,000 N/m. In some embodiments, the elasticity of the cured hydrogel composition is about 3400 N/m.

In some embodiments, the hydrogel composition used in the methods of the present disclosure has a density greater than about 1.10 g/cm$^3$ and an elasticity greater than about 2000 N/m. In some embodiments, the hydrogel composition has a density between about 1.11 g/cm$^3$ and about 1.50 g/cm$^3$ and an elasticity between about 2000 N/m and about 10,000 N/m. In some embodiments, the hydrogel composition has a density of about 1.15 g/cm$^3$ and an elasticity of about 3400 N/m.

Thus, provided in the present disclosure is a method of treating a subterranean formation or cement construction that contains one or more contaminants. In some embodiments, the method includes providing to the subterranean formation or cement construction a hydrogel composition, such as described in the present disclosure. In some embodiments, the hydrogel composition has a water-thin viscosity. In some embodiments, the hydrogel composition contains a poly-alkene maleic anhydride copolymer, polyethylene glycol, and an aqueous carrier. In some embodiments, the hydrogel composition further contains a crosslinker. In some embodiments, the total amount of the poly-alkene maleic anhydride copolymer and the polyethylene glycol of the hydrogel composition is about 10% to about 50%. In some embodiments, the hydrogel composition is pumpable and settable up to a temperature of about 200° F. to about 450° F. For example, the composition is pumpable and settable up to a temperature of about 200° F. to about 450° F., where the hydrogel composition can set and form a solid at a temperature of about 200° F. to about 450° F.

Also provided in the present disclosure is a method of displacing hydrocarbons in production wells. In some embodiments, the method includes providing to the production well a hydrogel composition having a viscosity of about 2000 mPa·s to about 10,000 mPa·s at 22° C. and setting the hydrogel composition to form a resin, thereby allowing the hydrocarbons in the production well to rise and be displaced. In some embodiments, the hydrogel composition contains a poly-alkene maleic anhydride copolymer, polyethylene glycol, and an aqueous carrier. In some embodiments, the hydrogel composition further contains a crosslinker. In some embodiments, the total amount of the poly-alkene maleic anhydride copolymer and the polyethylene glycol of the hydrogel composition is about 10% to about 50%. In some embodiments, the hydrogel composition is pumpable and settable up to a temperature of about 200° F. to about 450° F. For example, the composition is pumpable and settable up to a temperature of about 200° F. to about 450° F., where the hydrogel composition can set and form a solid at a temperature of about 200° F. to about 450° F. In some embodiments, the method is used in enhanced oil recovery (EOR). In some embodiments, the hydrogel composition contains about 10% to about 30% poly-isobutylene maleic anhydride copolymer having a weight-average molecular weight of about 55,000 Da to about 65,000 Da, a density of about 1.3 g/m$^3$, and 80% particle size distribution of 12-200 mesh; and about 1% to about 20% polyethylene glycol having an average molecular weight of about 10,000 Da to about 30,000 Da and a density of about 1.2 g/m$^3$. In some embodiments of the method, the hydrogel composition further contains a crosslinker. In some embodiments, the crosslinker is selected from an ethyleneamine, a benzenetricarboxylic acid, a benzimidazole, and citric acid, and combinations thereof. In some embodiments of the method, the hydrocarbons are diesel. In some embodiments, the hydrogel composition sets in the presence of up to about 50% (v/v) diesel.

In some embodiments of the methods described in the present disclosure, the contaminants are selected from the group consisting of acid, brine, diesel, and oil-based mud. In some embodiments, the contaminant is acid. In some embodiments, the contaminant is hydrochloric acid (HCl). In some embodiments, the contaminant is brine. In some embodiments, the contaminant is potassium chloride (KCl). In some embodiments, the contaminant is diesel. In some embodiments, the contaminant is oil-based mud (OBM). In some embodiments, the wellbore fluid contaminant is present in an amount of up to about 50%. In some embodiments of the method, the hydrogel composition is able to set and form a solid at temperatures of about 200° F. to about 450° F. in the presence of contaminants. In some embodiments of the method, the hydrogel composition is able to set and form a solid at temperatures of about 200° F. to about 450° F. in the presence of up to about 50% (v/v) wellbore fluids contaminant. In some embodiments, setting the hydrogel composition and forming the solid prevents or retards undesired loss or flow of wellbore fluid into the formation or construction; or the flow of formation fluids into the formation or construction.

Thus, in some embodiments of the methods provided in the present disclosure, once the gel sets, it retains desirable mechanical, thermal, and chemical properties, even under multiple harsh environments, such as, for example, high temperature, high pressure, corrosive chemicals, including acid, base, and brine, and other contaminants. Thus, provided are methods of using the hydrogel composition at pressures of about 1,000 psi to about 3,000 psi. Also provided are methods of using the hydrogel composition at room temperature up to a pressure of about 7,500 psi. Also provided are methods of using the hydrogel composition at a temperature range of about 150° F. to about 450° F. In some embodiments, at lower temperatures, such as room temperature to about 150° F., the hydrogel composition serves as a water-thin carrying fluid for applications as a liquid flowable polymer. In some embodiments, at higher temperatures, the liquid polymer maintains fluidity with the removal of crosslinking agents to remain a liquid polymer.

Also provided are methods of using the hydrogel composition described in the present disclosure as one or more of a loss circulation material, completion fluid, enhanced oil recovery solution, well control, and as a stimulating fluid. Also provided are methods of using the hydrogel composition in applications in biomedical fields, including, but not limited to, molding polymers for biotechnology, synthetic organs, fluid gels, carrier fluids, dispersed fluids and continuous fluids, and salt bridges. Also provided are methods of using the hydrogel composition in applications in textiles, coatings, encapsulation, construction, and medicine.

EXAMPLES

Example 1

A hydrogel composition was prepared from a polymer containing the components shown in Table 1. To prepare the hydrogel composition, the reagents were added to water and the solution was stirred into a clear solution.

TABLE 1

| Polymer components | |
| --- | --- |
| Reagent | Amount (%) |
| Sodium hydroxide (NaOH) | 4.5 |
| Isobam 104 (poly-isobutylene maleic anhydride) | 20 |
| Citric acid (CA) | 0.2 |

TABLE 1-continued

| Polymer components | |
| --- | --- |
| Reagent | Amount (%) |
| Trisodium phosphate (TSP) | 0.05 |
| Amino(phenyl)benzimidazole (APBZ) | 0.2 |
| Trimesic acid (TMA) | 0.4 |
| Polyethylene glycol (PEG) | 10 |
| Tetraethylenepentamine (TEP) | 1.0 |

At an engineered time and temperature, the fluid rapidly set into a polymer gel with inherent elasticity. As the gel polymer cured, changes in viscous modulus as temperature increased showed crosslinking and structural production (FIG. 1). The hydrogel maintained its shape and elasticity and had a shelf-life of more than one-year, as syneresis and free water were not evident.

Example 2

The alkali-tolerance of the hydrogel composition prepared according to Example 1 was tested. The hydrogel was shown to set at pH between 10 and 14. When a piece of ordinary Portland cement was placed in the hydrogel liquid, a gel formed around the cement piece. The hydrogel set successfully when cement was embedded. By contrast, placing a lower-density liquid resin that is comparable, in proximity with a highly alkaline system, like ordinary Portland cement, induced gel instability and high rates of syneresis. A pacifying buffer in a pre-treatment solution was needed to surface wash the cement and to reduce polymer instability. Using the hydrogel of Example 1 allowed for elimination of the use of a buffer wash when placing polymer liquids downhole.

The hydrogel of Example 1 was measured by a dynamic rheological consistometer to measure thickening time (TT), from room temperature up to 400° F., under confined pressure, including 1,000 psi up to 3,000 psi.

Figure 2:
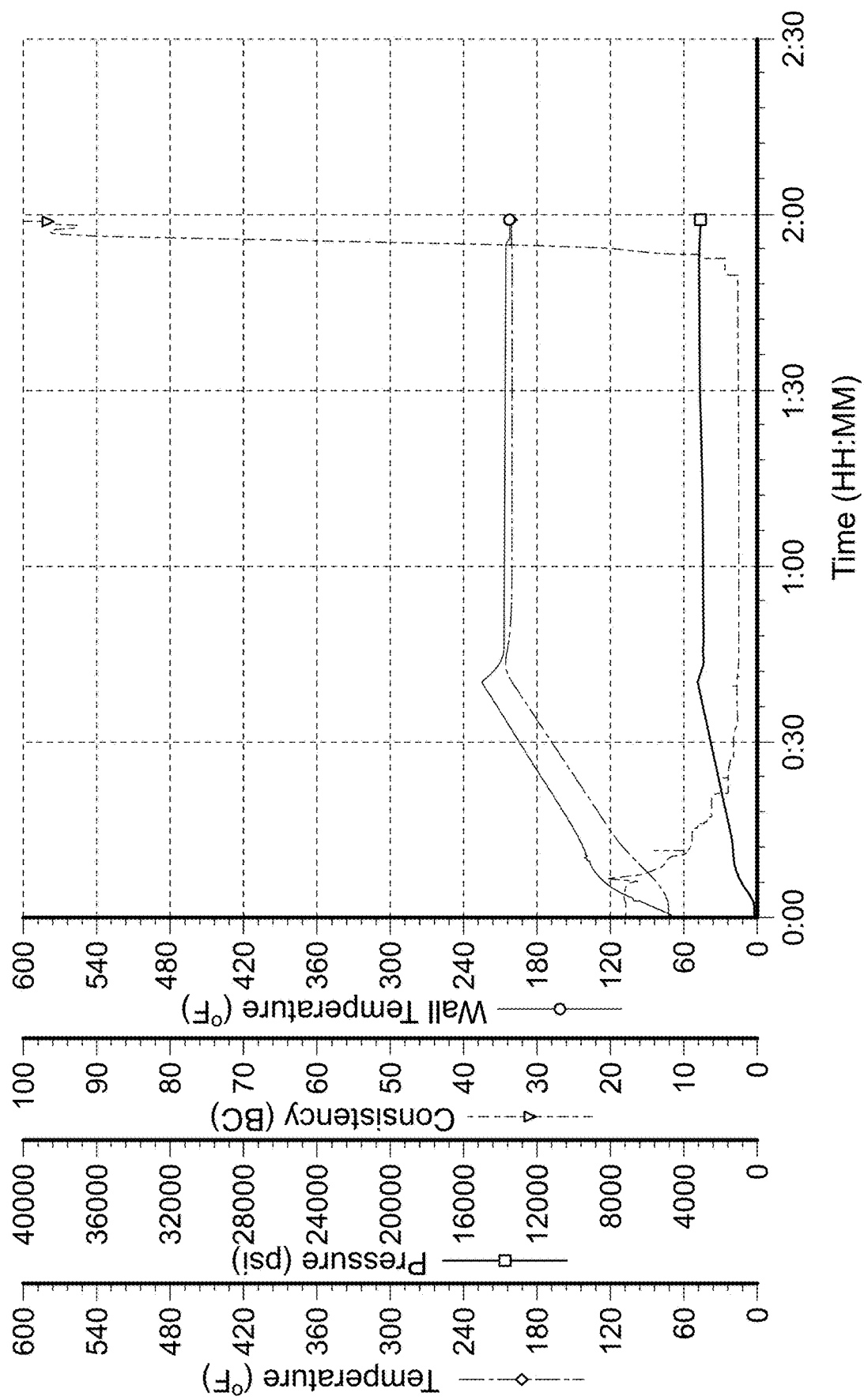
FIG. 2 depicts isotherm curing of an exemplary hydrogel composition at 200° F.

Isotherm curing of the hydrogel composition was performed. Here, the hydrogel was cured at a single temperature to find the lowest temperature for curing (Table 2). Table 2 is a summary of thickening times at different temperatures for the hydrogel. Measurements were taken at 150° F., 180° F., 200° F., 250° F., 350° F., and 400° F. in six different experiments using a high temperature, high pressure (HTHP) consistometer. At 150° F., thickening time significantly increased and took at least 48 hours. A change to 180° F. allowed the hydrogel to set at 5 hours. As shown, the hydrogel is applicable at temperatures from 180° F. to 400° F. and can easily be implemented in the field through standard pumping practices. At 200° F., the gel has a right-angle set profile (FIG. 2). The data illustrates that the hydrogel is a high-temperature thermosetting gel polymer.

TABLE 2

| Thickening times of the hydrogel composition | |
| --- | --- |
| Temperature (° F.) | Set time (TT) (HH:MM) |
| 150 | 48:00 |
| 180 | 5:00 |
| 200 | 1:50 |
| 250 | 0:32 |
| 350 | 0:27 |
| 400 | 0:33 |

Figure 3:
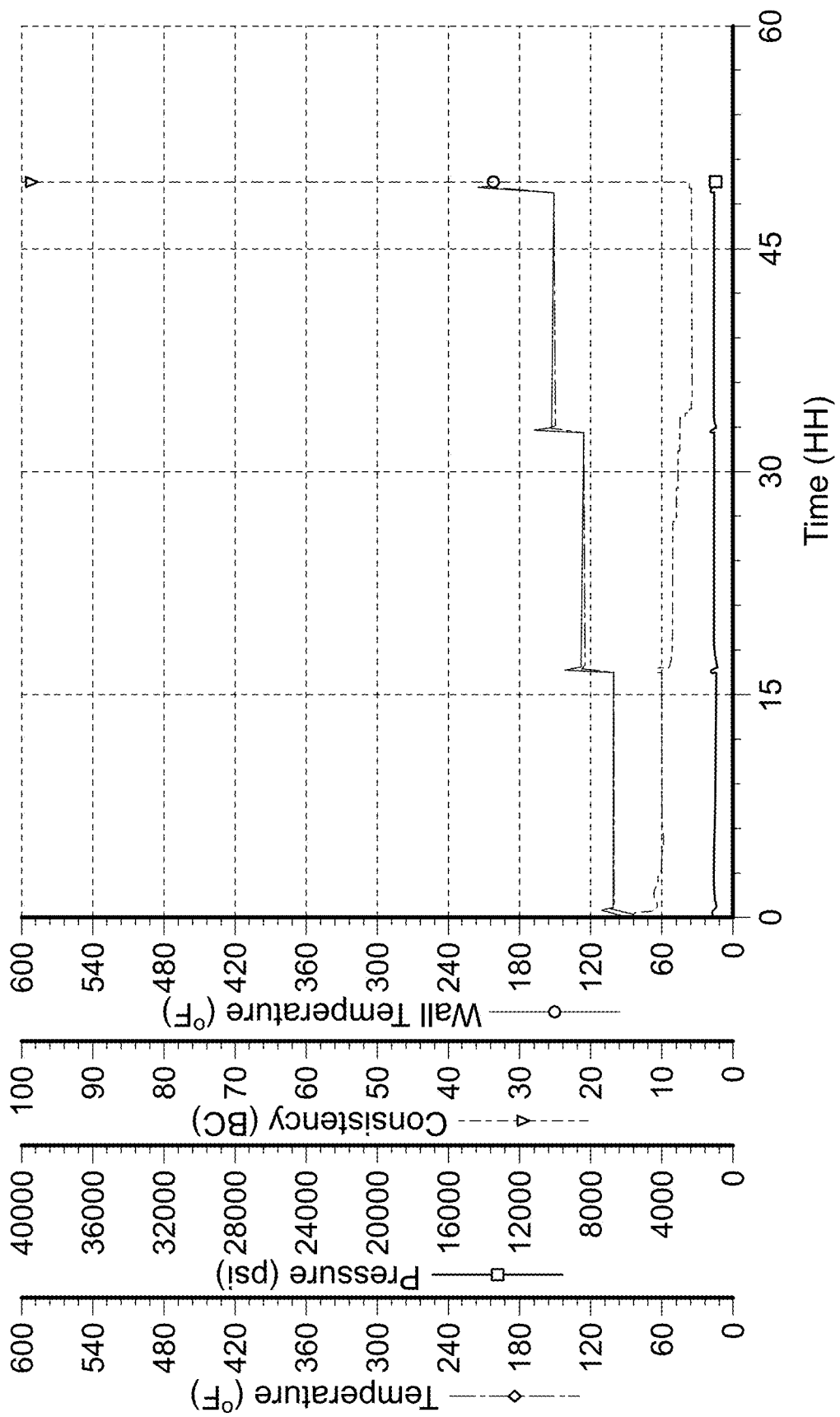
FIG. 3 shows a segmented temperature gradient cure for an exemplary hydrogel.

A segmented temperature gradient cure was used to find the temperature- and time-dependent thickening times, from 100° F. to 250° F. over the span of 50 hours (FIG. 3). For segmented temperature step-wise curing of the hydrogel composition, stability of the composition up to 150° F. was demonstrated with temperature sweep from room temperature to target temperature. As shown in FIG. 3, the sample stayed at each temperature for 16 hours before step-change increase to the next temperature from 100° F., 125° F., 150° F., 200° F., and 250° F. The hydrogel set at 200° F. with a cumulative time of 49 hours, 33 minutes (49:33). The hydrogel maintained water-thin viscosity up to 150° F. for easy handling, storage, and application at higher temperatures. The hydrogel was observed to set at a right-angle at 200° F. No thermo-degradation was observed, even after 50 hours. They hydrogel exhibited chemical stability and stable shelf-life (as a liquid) up to 150° F., before curing in field application.

Figure 4:
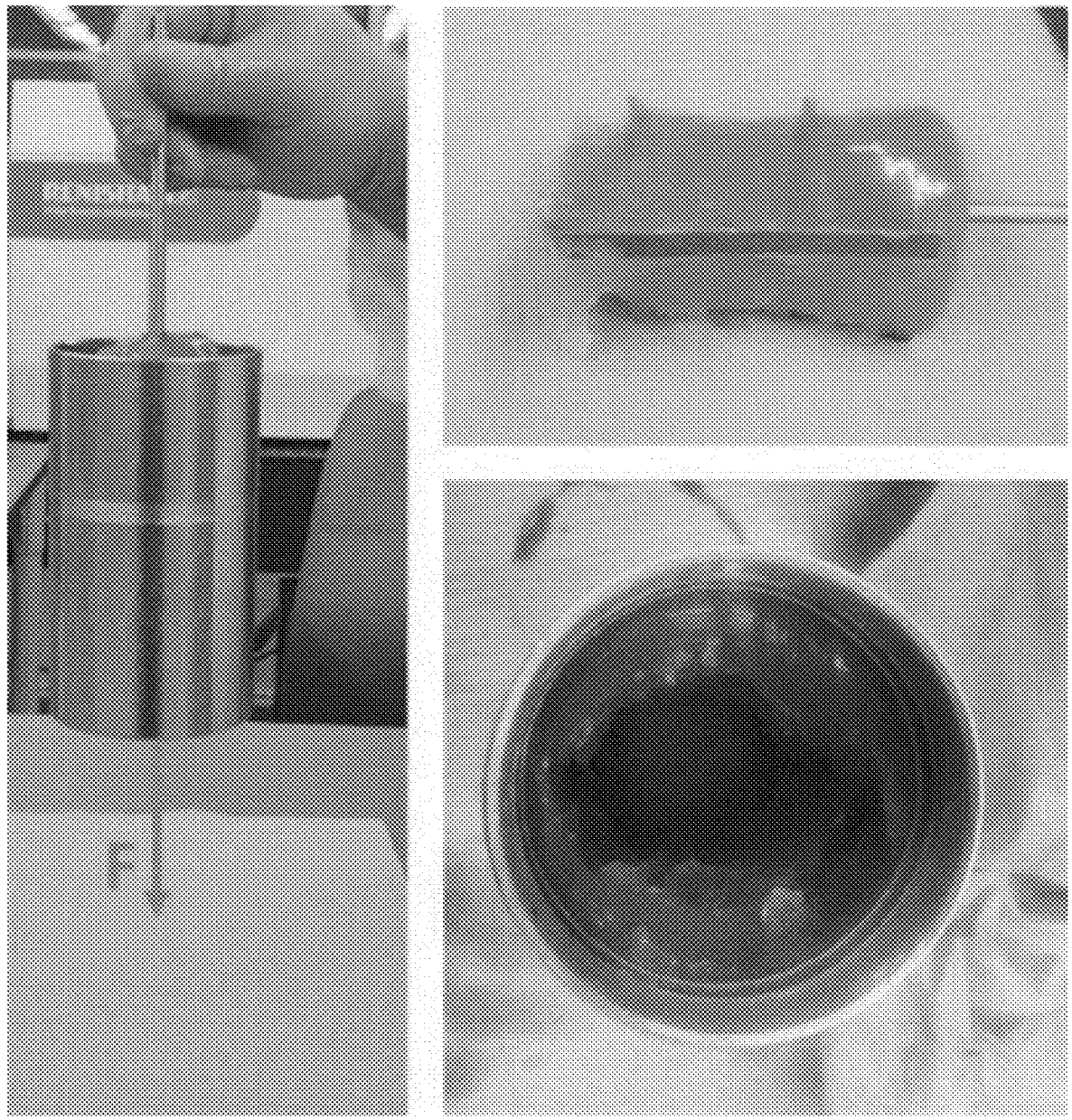
FIG. 4 illustrates the affinity of an exemplary hydrogel composition for metal.

The strength of the hydrogel composition was also measured, demonstrating its strong bonding with metal. FIG. 4 shows how the hydrogel product held onto the apparatus of approximately 1,183 g (weight of all-metal paddle and slurry cup) plus the weight of the hydrogel itself that filled a 600 mL volume; overall, a total weight of about 2,000 g (2 kg), while suspended in air. The hydrogel, having an affinity to the metal cup, demonstrated strength to hold the weight of the cup, paddle, and gel. Oscillating movements in the vertical direction demonstrated gel robustness and elasticity. As can be seen in FIG. 4, the hydrogel was suspended in air and bounced to demonstrate robustness and elasticity. Force was needed to separate the set polymer gel from the slurry cup and paddle.

Example 3

Figure 5:
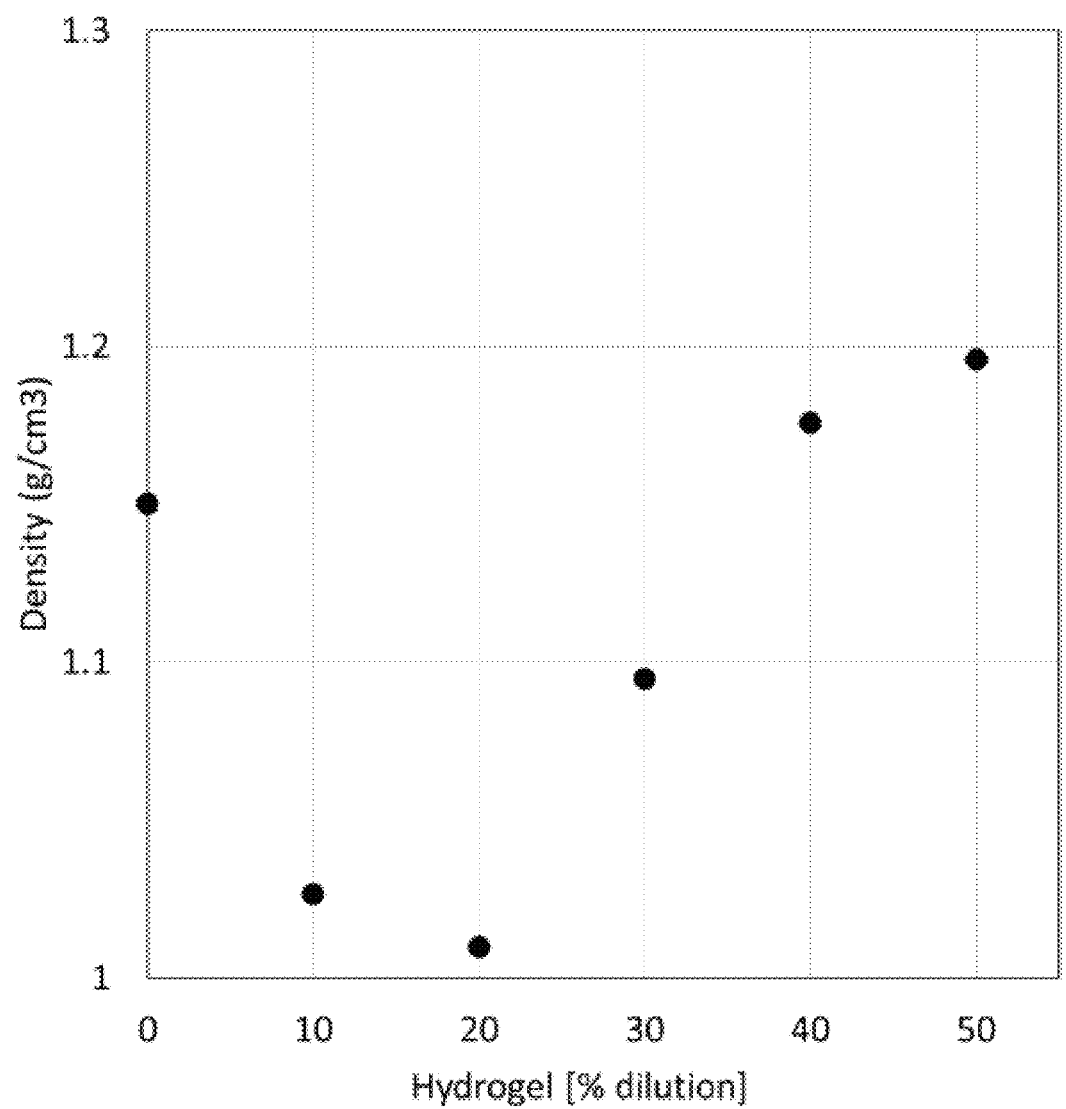
FIG. 5 depicts density of an exemplary hydrogel composition upon dilution with acid (HCl).

HCl is commonly used in well stimulation. The hydrogel liquid of Example 1 was diluted by 10%, 20%, 30%, 40%, and 50% with a 10% concentrated HCl solution (37%) to test the water and acid tolerance of the hydrogel composition. As shown in FIG. 5, with the addition of acid (acidification) in excess at 40% and 50% dilution, polymer density increased and began to rebound to the original value as crosslinking increased, demonstrating the tolerance of the hydrogel composition to water and acid. The results are shown in Table 3.

TABLE 3

| HCl (% (v/v)) | Density (g/cm³) | SD |
| --- | --- | --- |
| 0 | 1.15 | 0.0012 |
| 10 | 1.0266 | 0.0069 |
| 20 | 1.0097 | 0.0009 |
| 30 | 1.0946 | 0.0006 |
| 40 | 1.1756 | 0.0008 |
| 50 | 1.1957 | 0.0005 |

Figure 6:
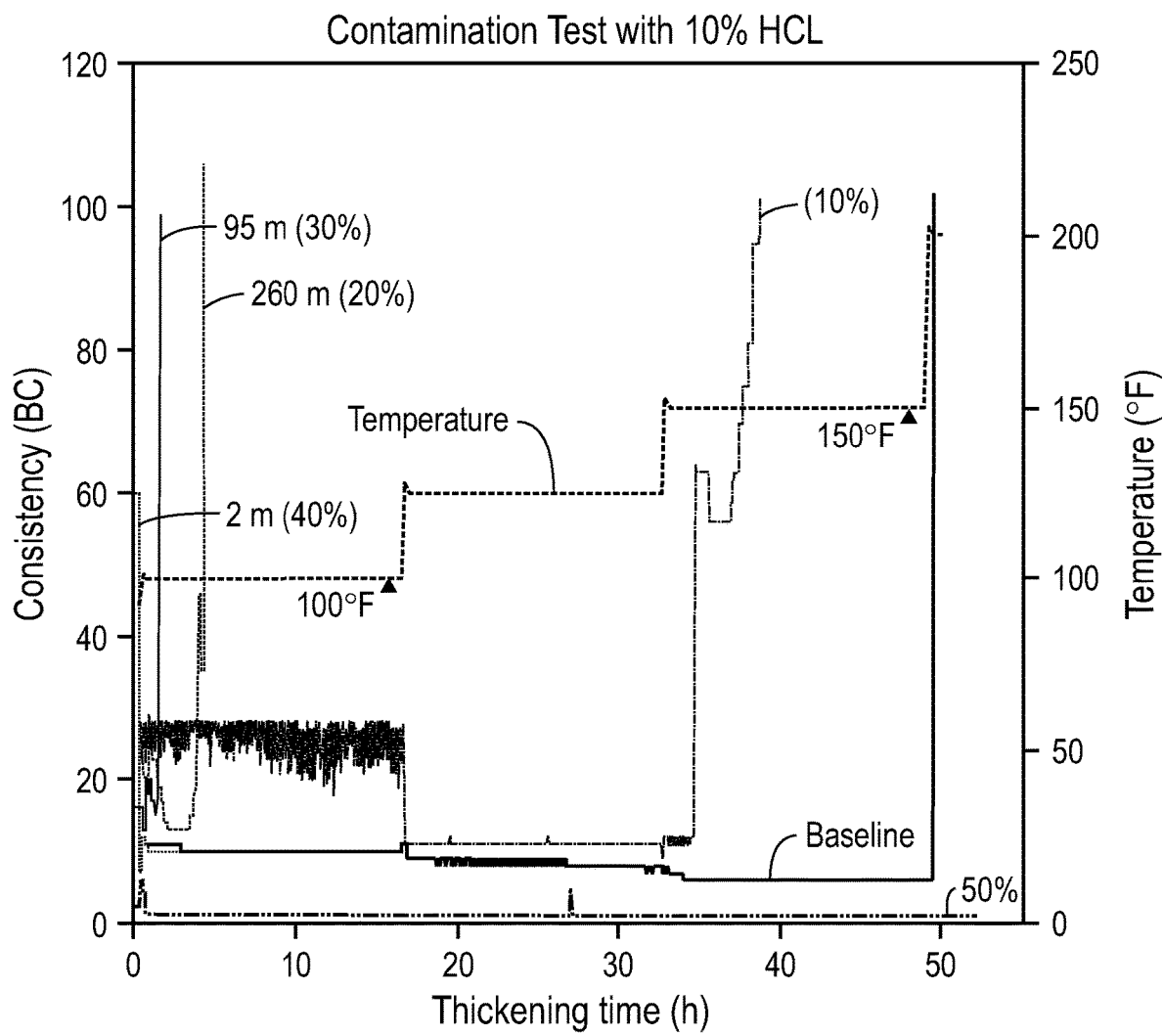
FIG. 6 shows the results of a contamination test (thickening time, consistency) after diluting an exemplary hydrogel composition with HCl as measured using a HTHP consistometer.

A contamination test, where the hydrogel was diluted by the 10% HCl solution showed that the gel system continued to set at a right-angle (FIG. 6). Specifically, high concentrations of highly reactive functional groups cure at low temperatures under strongly acidic conditions. The hydrogel successfully performed at 50% dilution by acid. Curing temperature decreased significantly from 50 hours to less than 5 minutes at room temperature with the addition of the 10% HCl solution at 100 Bc. At 50% dilution, the reaction went to completion before inserting the sample into the HTHP consistometer, by reacting at room temperature. No temperature increase was needed. The hydrogel demonstrated high responsiveness to acid, setting the curing temperature at room temperature (77° F. to 100° F.). The results are shown in Table 4.

TABLE 4

Thickening times of hydrogel composition with 10% HCl using segmented temperature curing

| Sample dilution | Set time (TT) (HH:MM:SS) | Set temperature (° F.) |
| --- | --- | --- |
| 0% | 49:33:45 | 200 |
| 10% | 38:44:25 | 150 |
| 20% | 4:19:10 | 200 |
| 30% | 1:34:45 | 100 |
| 40% | 0:02:10 | 77 |
| 50% | No data | 77 |

Example 4

Figure 7:
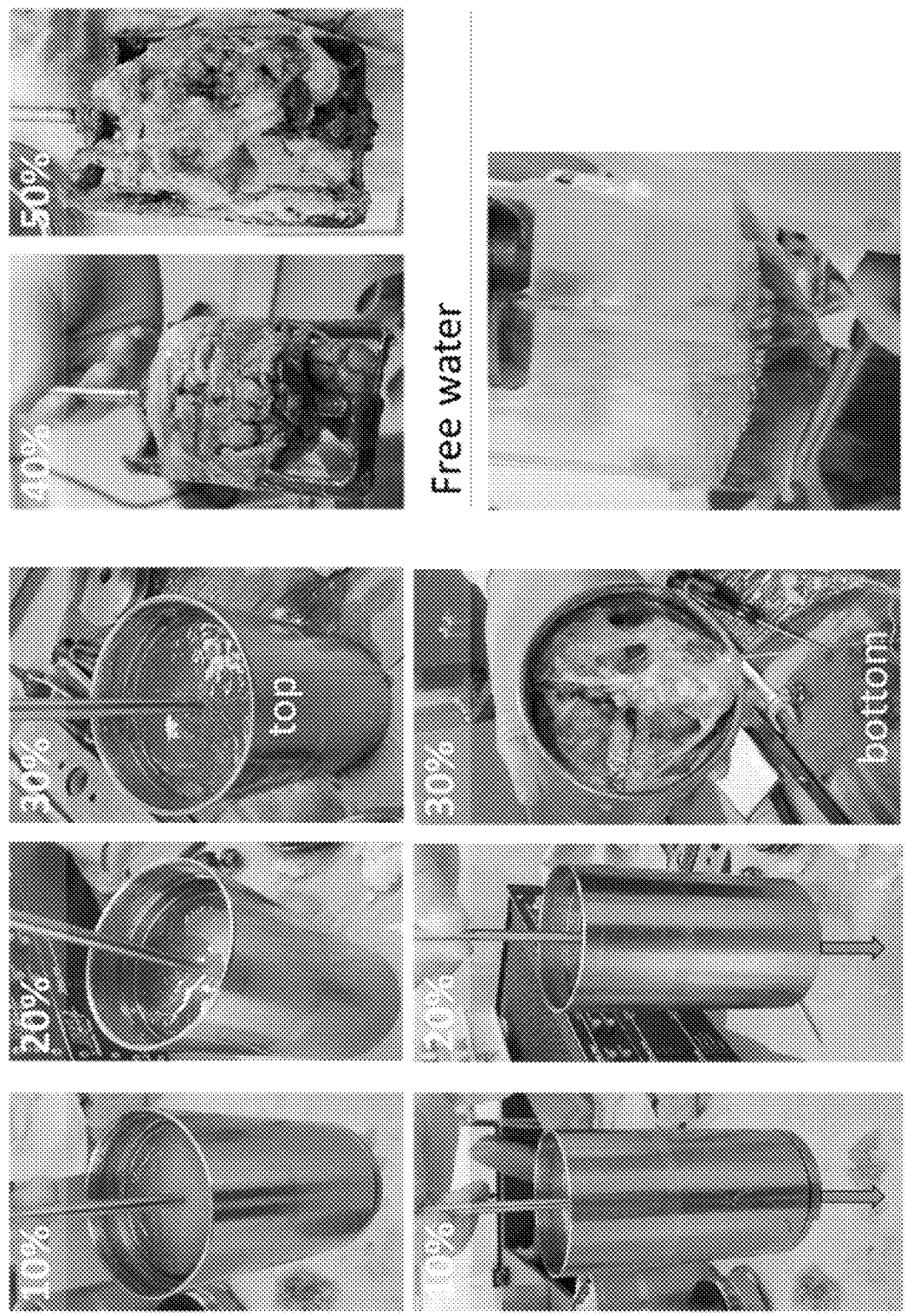
FIG. 7 shows gelled samples taken from HTHP consistometer tests (1,000 psi).

The hydrogel of Example 1 was formed by increased crosslinking to form a multiple complicated nonlinear polymer structure. FIG. 7 demonstrates polymer strength (—F) using Hook's law, which states strain of the material is directionally proportional to applied stress (here, weight of slurry cup with polymer and paddle) within the elastic limit of the gel system. Vertical oscillation (bouncing the cup) and stretching of the gel demonstrates how the polymer stretched and deformed when stress was applied; and when stress was removed the polymer returned to its initial state. A softer elastic polymer stretches and yields to strains downhole. No thermal or chemical degradation was observed. The elastic behavior did not degrade at higher inclusion of HCl. At 30%, an opaque, dense, white polymer formed and settled at the bottom of the cup. At 40% and above, free water and a higher density gel system occurred. The data illustrates self-curing of the hydrogel which lead to the usual steep increase in viscosity, whereas control tests in this study showed how the hydrogel was normally not reactive and needed high curing temperatures.

As shown in Table 5, addition of the HCl solution caused a change in pH of the hydrogel.

TABLE 5 pH of hydrogel compositions with increasing acid

| Sample dilution | pH |
| --- | --- |
| 0% | 10.4 |
| 10% | 8.9 |
| 20% | 5.0 |
| 30% | 2.9 |
| 40% | 0.1 (limit of pH meter) |
| 50% | −0.1 (pH closer to pH of HCl solution) |

Example 5

The water- and brine-tolerance of the hydrogel composition prepared according to Example 1 was tested. Formation water and brines, for example, exist naturally in rocks. Salts like KCl are also heavily used in oilfield operations as a brine fluid for oilfield completion and workover processes and for stabilizing or preventing shale and clay from swelling. The hydrogel composition was tested with 10%, 20%, 30%, 40%, and 50% brine. The brine solution used contained 5% KCl.

Thickening times of the hydrogel composition upon dilution with the 5% KCl solution using segmented temperature curing are shown in Table 6. The polymer thickening time remained the same. It took about 50 cumulative hours for the gel liquid to thicken at a right angle, showing the same profile control.

TABLE 6

Thickening times of hydrogel composition with 5% KCl using segmented temperature curing

| Sample dilution | Set time (TT) (HH:MM:SS) | Set temperature (° F.) |
| --- | --- | --- |
| 0% | 49:33:45 | 200 |
| 10% | 50:01:15 | 200 |
| 20% | 49:40:05 | 200 |
| 30% | 50:06:00 | 200 |
| 40% | 49:29:15 | 200 |
| 50% | 50:23:16 | 200 |

Figure 8:
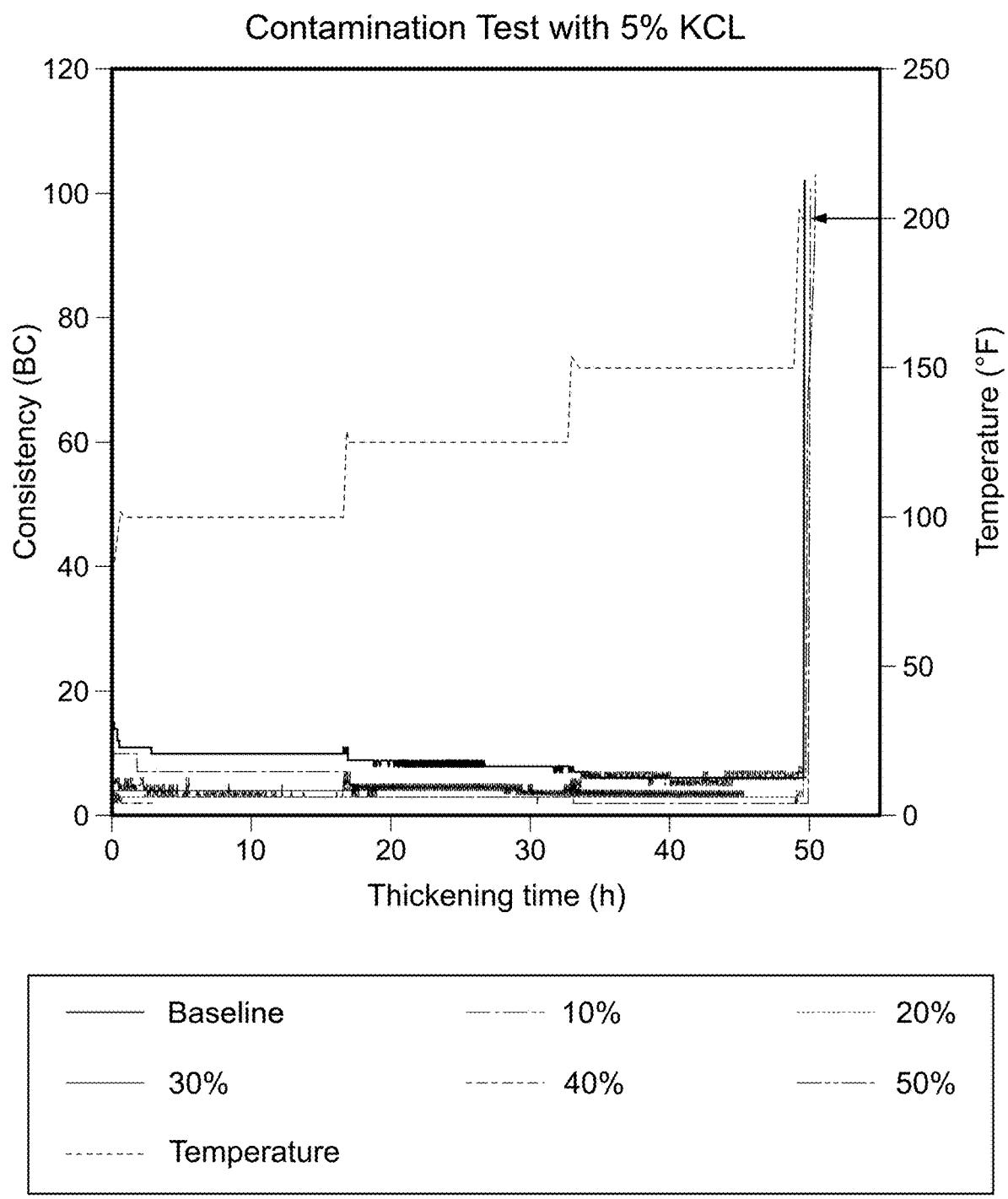
FIG. 8 shows the results of a contamination test (thickening time, consistency) after diluting an exemplary hydrogel composition with KCl as measured using a HTHP consistometer.

A contamination test, where the hydrogel was diluted with the 5% KCl solution, showed that the hydrogel system successfully performed at up to 50% dilution by brine (FIG. 8). The hydrogel is recommended for higher-temperature applications at 200° F. to 400° F., as the high-molecular weight water-based polymer set under confined hostile brine conditions and 200° F., the hydrogel remained water-thin until the gel reached 200° F., and near the gel point, as temperature increased, viscosity increased rapidly to 100 Bc (FIG. 8).

Figure 9:
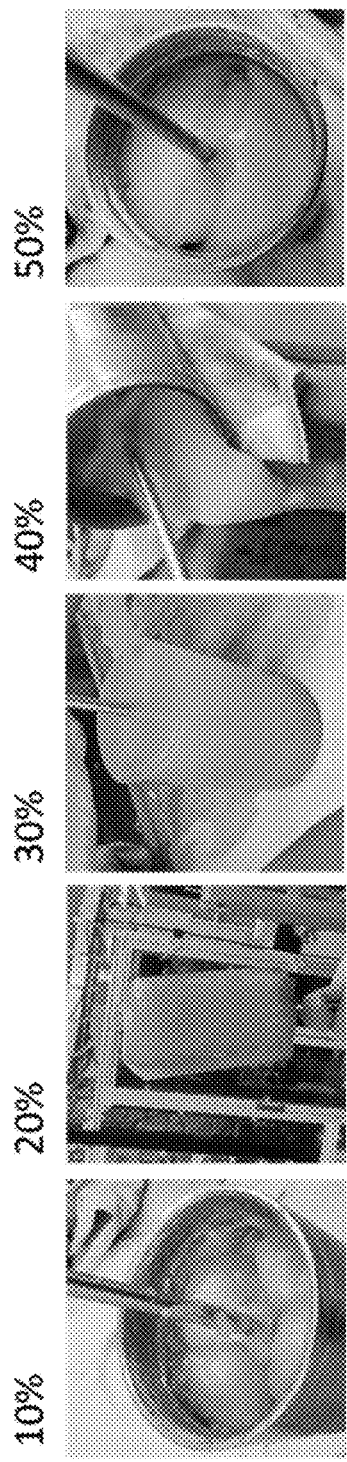
FIG. 9 shows gelled samples taken from HTHP consistometer tests.

FIG. 9 shows how the fluid continued to set in a matter of minutes, at a right angle, leading to a gel formation, as reflected in a loss in fluidity and the formation of a 3D network. The 5% KCl solution was added at concentrations of 10%, 20%, 30%, 20%, and 50%. For HTHP consistometer measurements, KCl addition was not detrimental. The results illustrate the brine-tolerance of the gel system that formed a stiff solid.

Figure 10:
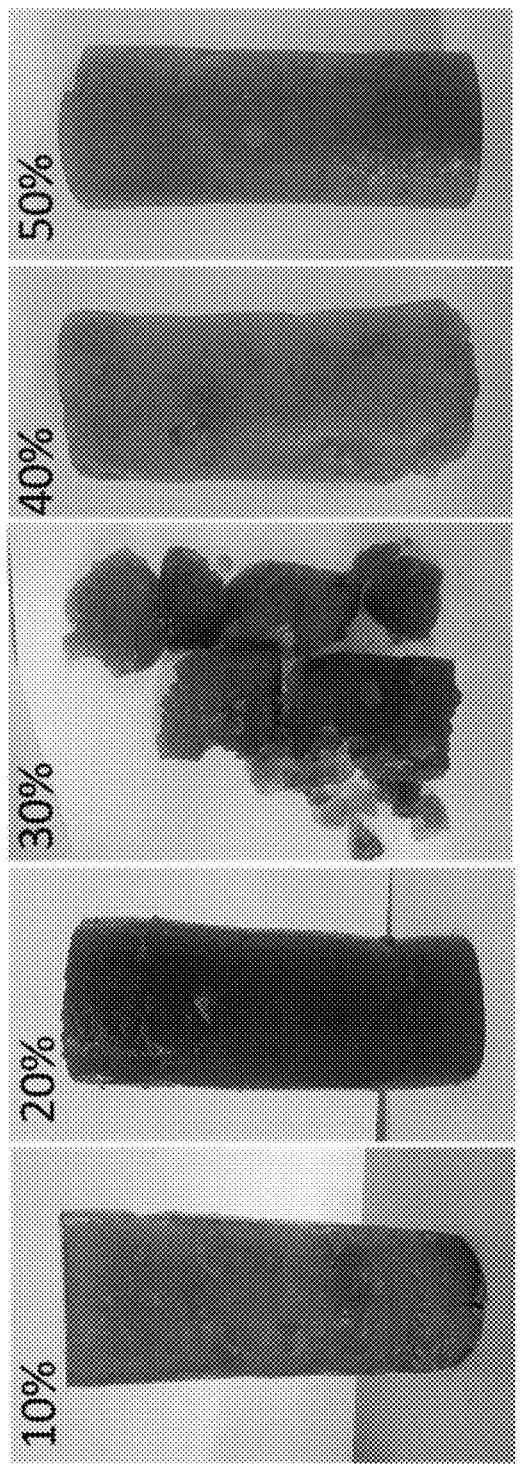
FIG. 10 illustrates long-term cure results of an exemplary hydrogel composition diluted with a 5% brine solution.

Long-term cure results were also demonstrated and shown in FIG. 10. After 3 days in the curing chamber at 1,000 psi, the thoroughly mixed polymer solution cured into a solid to demonstrate material performance after gradient dilution by KCl. Force was needed to separate the gel from the mold. No thermal degradation from brine mixing was observed and no significant impact on gel solidification was observed.

Example 6

Performance of the hydrogel composition in an oil-based mud (OBM) environment, in the presence of diesel, was evaluated. Contamination tolerance studies were conducted by using diesel to dilute the composition. The results showed that performance of the hydrogel composition with up to 50% dilution with diesel was not affected.

In this study, an OBM environment was represented by diesel (which may exist as a contamination downhole from drilling fluids or from production). High temperature OBM are made with diesel, which makes diesel an ideal organic solvent contaminate that is relevant to the oilfield and other harsh applications. This study tested the effects of OBM solvent on the performance of the hydrogel of Example 1. The results demonstrated the rheological properties of mixing hydrogel with diesel and showed that the presence of diesel did not hinder the gelation of the hydrogel.

Thickening time (TT) at the estimated bottom hole temperature and pressure was tested using a consistometer to 70-100 Bc as follows. The resin was placed into the consistometer cup first. Diesel was carefully added over the resin, and the cup was sealed. Mixing of the two solutions was left to the paddle when measurement started. Changes in viscosity were recorded. Thermoset structural development was typically accompanied by significant changes in rheological measurements: the sample changed from a low-viscosity liquid, to a gel, and then to a stiff solid when cured at temperature.

Here, temperature sweep was performed to determine the thickening time of the thermosetting system. Changes in viscous modulus as heat ramped up recorded crosslinking and structural production as the resin cured. A segmented temperature gradient cure was used to find the temperature- and time-dependent thickening times as the resin cured. Continuous heating from room temperature (70° F.) to 100° F. to 450° F. over the span of many hours demonstrated the reliability and durability of the hydrogel for high temperature applications. Hydrogels placed with diesel of various amounts set at a right-angle near 200° F. As temperature increased, thinning occurred. But no thermo-degradation of the polymer was observed, which indicated chemical stability.

The 16-hour temperature sweep in a multi-step process was used to evaluate performance using HTHP consistometers. This study showed tests starting at 100° F. and staying for 16 hours. "No Reaction" after 16 hours prompted an increase in temperature to 125° F. for another 16 hours, and so on, up to 250° F. in 25-50 degree increments. Until the resin set (100 Bc), time and temperature were recorded. Therefore, characterization of time-temperature-viscosity behavior of the settable hydrogel at gradient dilution concentrations was conducted using a segmented temperature gradient method, measuring viscosity as a function of both time and temperature. By introducing time-temperature integrals, generalized behavior was observed. The thickening times of the hydrogel with diesel using segmented temperature curing is displayed in Table 7.

TABLE 7

Hydrogel with diesel thickening times

| Sample dilution | Set time (TT) (HH:MM:SS) | Set temperature (° F.) |
| --- | --- | --- |
| 10% | 54:20:20 | 200 |
| 20% | 55:49:35 | 200 |
| 40% | 60:43:45 | 200 |
| 50% | 52:28:00 | 200 |

Figure 11:
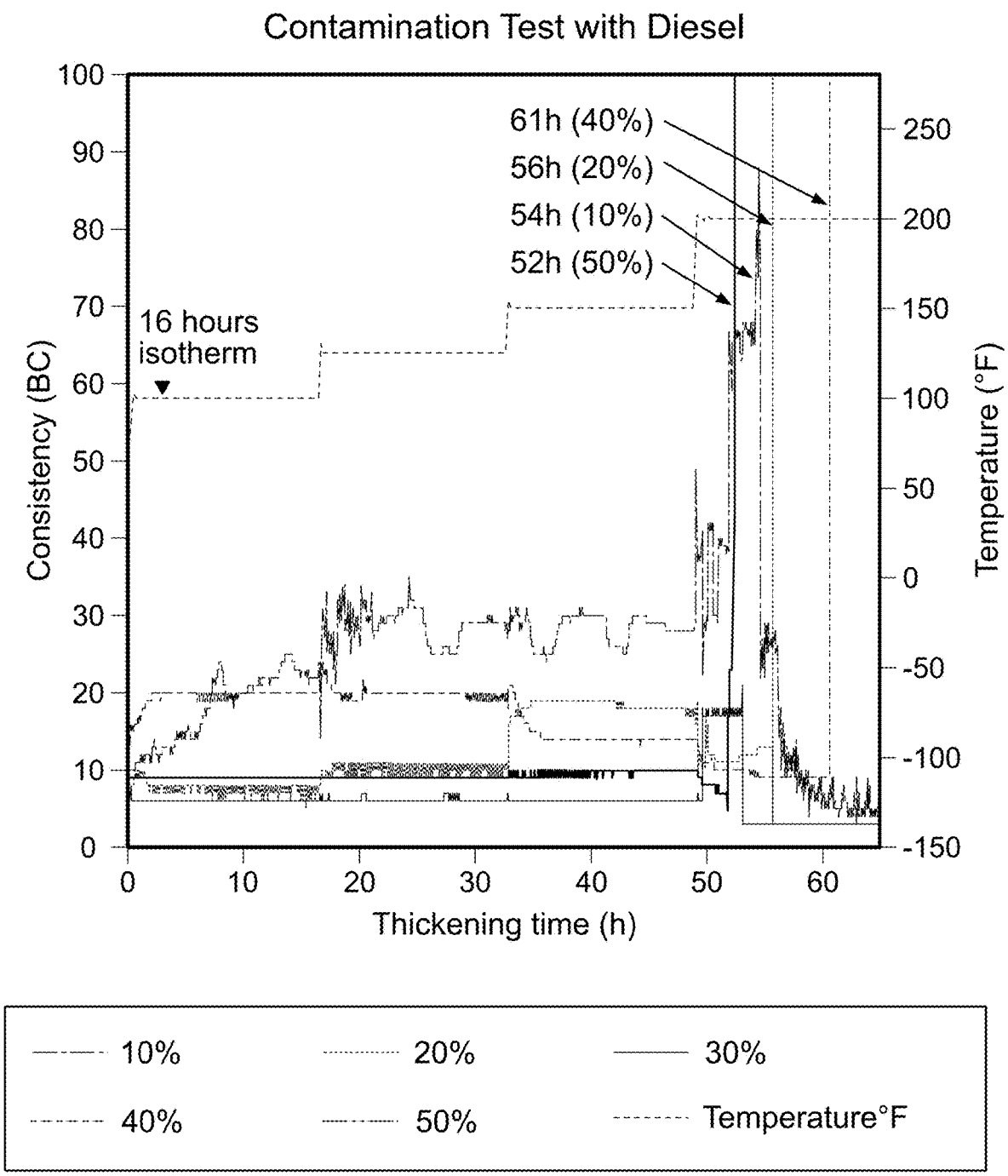
FIG. 11 shows the results of a contamination test (thickening time, consistency) after diluting an exemplary hydrogel composition with diesel as measured using a HTHP consistometer.
Figure 12:
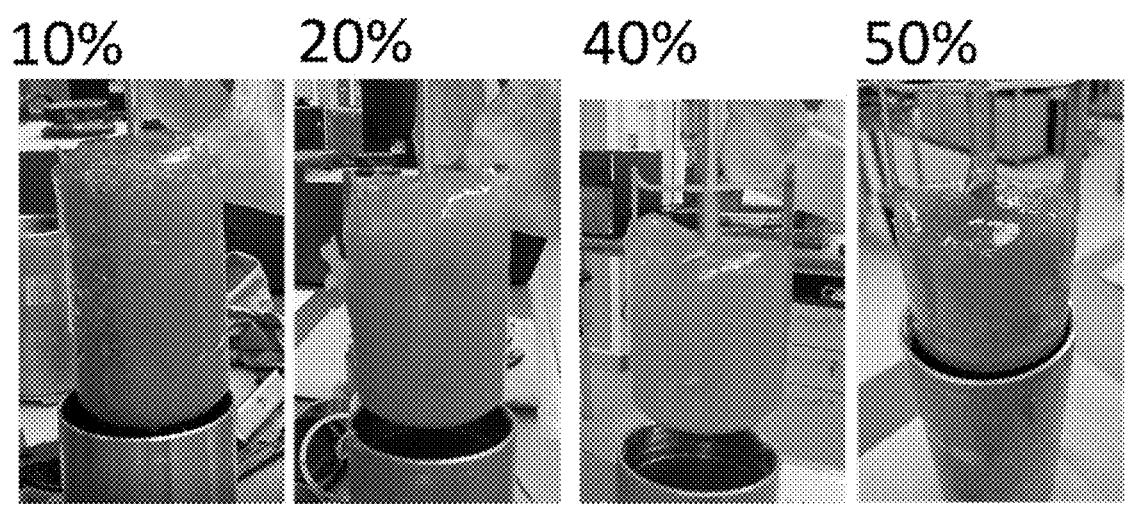
FIG. 12 illustrates settable polymer product upon dilution of resin by diesel using a HTHP consistometer.
Figures 13A, 13B:
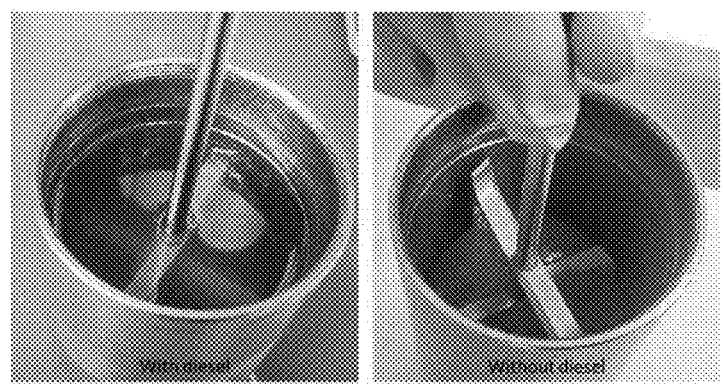
FIG. 13A shows the diesel supernatant at the end of each consistometer test.
FIG. 13B shows the settable polymer product.

As shown in FIG. 11, for the hydrogel diluted with diesel up to 50%, the hydrogel remained water thin (between 0-35 Bc) until 200° F. (set time). At this temperature the fluid set into a settable polymer in a matter of minutes, at a right angle. The resin was measured up to or before the gel point, using a HTHP consistometer (FIG. 12). At the gel point, the solution underwent gelation, leading to a gel formation, as reflected in a loss in fluidity and the formation of a 3D network. Near the gel point, as temperature increased, viscosity increased rapidly to 100 Bc and became unmeasurable—and the HTHP consistometer stopped. No thermal degradation from diesel contaminant and no significant impact on the solidification of the resin system was observed. For HTHP consistometer measurements, the effects of diesel and dilution were not detrimental to the hydrogel, and the resin formed a stiff solid (FIG. 13B). When the resin set into a solid using the HTHP consistometer, force was needed to remove the resin.

With the consistometer mixing, the test was conducted until the hydrogel set at 70-130 Bc. FIG. 13A shows that the hydrogel set and displaced diesel as supernatant to the top layer. Table 7 shows recovery of diesel at the end of tests that produced clear diesel supernatant solutions. Greater weight of decanted supernatant may result from solubilized particles, where almost a 1:1 ratio in recovery was obtained regardless of testing parameters (time and temperature). The liquid resin sets into a solid gel to displace diesel as an application in enhanced oil recovery (EOR).

TABLE 7

Decanted amounts of diesel supernatant and recovery

|  | 1 | 2 | 3 | 4 |
|---|---|---|---|---|
| Diesel amount added (g) | 84.02 | 126 | 168.06 | 209.91 |
| Final temperature (° F.) | 200 | 450 | 200 | 200 |
| Test length (h) | 55.8 | 140 | 61 | 52.5 |
| Diesel supernatant (g) | 78.0 | 131.48 | 172.06 | 180.2 |
| [decanted]/[added] | 0.93 | 1.04 | 1.02 | 0.86 |

As the diesel contamination studies have shown, the hydrogel polymer cured by 200° F. at all levels of diesel contamination (up to 500%) and there was no effect on the temperature with crosslinking. Further, there was no thermal degradation of the polymer. The diesel supernatant was easily decanted after testing parameters, where the settable hydrogel remained set at the bottom of the consistometer. Other important outcomes also remained the same with diesel contamination: the hydrogel could be handled and stored up to 150° F. after mixing with no gelation; the hydrogel demonstrated high-temperature resistance (service temp. 200° F.-450° F.) and did not thermally degrade or soften at high temperatures; the right-angle setting time of the hydrogel formed reliably; the hydrogel offered mechanical performance and chemical resistance as a more elastic resin, and overall, in the presence of diesel, the hydrogel maintained elasticity to stretch and yield to strains downhole; and the hydrogel showed a water-thin consistency.

Example 7

A series of hydrogel compositions containing 0501% diluent were prepared that show high-tolerance for contaminants under extreme conditions (Table 9). Diluents included acid, salt, diesel, and water. Tests were conducted at 1,000-3,000 psi.

TABLE 9

Hydrogel compositions with diluents

|  | 1 | 0.9 | 0.8 | 0.7 | 0.6 | 0.5 |
|---|---|---|---|---|---|---|
| Water | 78% | 71% | 63% | 55% | 47% | 39% |
| Isobam | 20% | 18% | 16% | 14% | 12% | 10% |
| CA | 0.18% | 0.17% | 0.15% | 0.13% | 0.11% | 0.09% |
| TSP | 0.09% | 0.08% | 0.07% | 0.06% | 0.06% | 0.05% |
| TEPA | 0.92% | 0.83% | 0.74% | 0.65% | 0.55% | 0.46% |
| NaOH | 3.55% | 3.19% | 2.84% | 2.48% | 2.13% | 1.77% |
| APBZ | 0.20% | 0.18% | 0.16% | 0.14% | 0.12% | 0.10% |
| TMA | 0.40% | 0.36% | 0.32% | 0.28% | 0.24% | 0.20% |
| PEG | 7.84% | 7.05% | 6.27% | 5.48% | 4.70% | 3.92% |
| Diluent | 0 | 10% | 20% | 30% | 40% | 50% |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating a subterranean formation or cement construction comprising contaminants, wherein the method comprises:
   providing to the subterranean formation or cement construction a hydrogel composition having a viscosity of about 2000 mPa·s to about 10,000 mPa·s at 22° C., the hydrogel composition comprising:
   about 10% to about 30% poly-isobutylene maleic anhydride copolymer having a weight-average molecular weight of about 55,000 Da to about 65,000 Da, a density of about 1.3 g/m$^3$, and 80% particle size distribution of 12-200 mesh;
   about 1% to about 20% polyethylene glycol having an average molecular weight of about 10,000 Da to about 30,000 Da and a density of about 1.2 g/m$^3$; and
   an aqueous carrier,
   wherein the poly-isobutylene maleic anhydride copolymer and the polyethylene glycol comprise about 11% to about 50% of the hydrogel composition, and
   wherein the hydrogel composition is pumpable and settable up to a temperature of about 200° F. to about 450° F.

2. The method of claim 1, wherein the hydrogel composition sets and forms a solid at a temperature of about 200° F. to about 450° F.

3. The method of claim 2, wherein setting the hydrogel composition and forming the solid prevents or retards undesired loss or flow of a wellbore fluid into the formation or construction; or the flow of formation fluids into the formation or construction.

4. The method of claim 1, wherein the hydrogel composition comprises about 15% to about 25% poly-isobutylene maleic anhydride copolymer.

5. The method of claim 1, wherein the hydrogel composition comprises about 20% poly-isobutylene maleic anhydride copolymer.

6. The method of claim 1, wherein the polyethylene glycol has an average molecular weight of about 20,000 Da.

7. The method of claim 1, wherein the hydrogel composition comprises about 5% to about 15% polyethylene glycol.

8. The method of claim 1, wherein the hydrogel composition comprises about 10% polyethylene glycol.

9. The method of claim 1, wherein the viscosity of the hydrogel composition is about 3500 to about 9000 mPa·s at 22° C.

10. The method of claim 1, wherein the viscosity of the hydrogel composition is about 4000 to about 5500 mPa·s at 22° C.

11. The method of claim 1, wherein the hydrogel composition comprises a crosslinker.

12. The method of claim 11, wherein the crosslinker is selected from the group consisting of an ethyleneamine, a benzenetricarboxylic acid, a benzimidazole, and citric acid, and combinations thereof.

13. The method of claim 1, wherein the contaminants are selected from the group consisting of acid, brine, diesel, and oil-based mud.

14. The method of claim 1, wherein the subterranean formation or cement construction comprises up to about 50% (v/v) wellbore fluids contaminant.

15. The method of claim 1, wherein the hydrogel composition comprises a crosslinker selected from the group consisting of an ethyleneamine, a benzenetricarboxylic acid, a benzimidazole, and citric acid and combinations thereof.

16. A method of displacing hydrocarbons in a production well, wherein the method comprises:
  providing to the production well a hydrogel composition having a viscosity of about 2000 mPa·s to about 10,000 mPa·s at 22° C., the hydrogel composition comprising:
    about 10% to about 30% poly-isobutylene maleic anhydride copolymer having a weight-average molecular weight of about 55,000 Da to about 65,000 Da, a density of about 1.3 g/m$^3$, and 80% particle size distribution of 12-200 mesh;
    about 1% to about 20% polyethylene glycol having an average molecular weight of about 10,000 Da to about 30,000 Da and a density of about 1.2 g/m$^3$; and
    an aqueous carrier,
    wherein the poly-isobutylene maleic anhydride copolymer and the polyethylene glycol comprise about 11% to about 50% of the hydrogel composition, and
    wherein the hydrogel composition is pumpable and settable up to a temperature of about 200° F. to about 450° F.; and
  setting the hydrogel composition to form a resin, thereby displacing the hydrocarbons in the production well as a supernatant.

17. The method of claim 16, wherein the method is used in enhanced oil recovery (EOR).

18. The method of claim 16, wherein the hydrocarbons are diesel.

\* \* \* \* \*